US007762055B2

(12) United States Patent
Hoffman et al.

(10) Patent No.: US 7,762,055 B2
(45) **Date of Patent: *Jul. 27, 2010**

(54) EXTERNALLY HEATED ENGINE

(75) Inventors: Gary P. Hoffman, Middlesex, NY (US); Richard J. Ide, Middlesex, NY (US)

(73) Assignee: Renewable Thermodynamics, LLC, Middlesex, NY (US)

( * ) Notice: Subject to any disclaimer, the term of this patent is extended or adjusted under 35 U.S.C. 154(b) by 1087 days.

This patent is subject to a terminal disclaimer.

(21) Appl. No.: 11/446,951

(22) Filed: Jun. 5, 2006

(65) Prior Publication Data

US 2007/0095064 A1 May 3, 2007

Related U.S. Application Data

(63) Continuation of application No. 11/198,681, filed on Aug. 5, 2005, now Pat. No. 7,076,941.

(51) Int. Cl.
*F02C 5/00* (2006.01)

(52) U.S. Cl. ............................ 60/39.6; 60/525; 60/517

(58) Field of Classification Search ................ 60/39.02, 60/517, 518, 520, 522, 525
See application file for complete search history.

(56) References Cited

U.S. PATENT DOCUMENTS 3,996,745 A * 12/1976 Davoud et al. ................ 60/517
4,004,421 A * 1/1977 Cowans ........................ 60/516
4,389,844 A * 6/1983 Ackermann et al. ........... 60/517
7,076,941 B1 * 7/2006 Hoffman et al. .............. 60/643

* cited by examiner

*Primary Examiner*—Hoang M Nguyen
(74) *Attorney, Agent, or Firm*—Harris Beach LLP; Neal L. Slifkin

(57) ABSTRACT

An externally heated engine is provided which has at least two pistons. The first piston has a first side (working side) and a second side opposite the first side. The first side of the first piston and the first cylinder define a first working chamber containing working fluid. The second side of the first piston and the first cylinder define a first opposite chamber containing an opposing fluid. A heater heats the working fluid in the first cylinder. Preferably, the cylinder is heated by a heat source so that the working fluid has a temperature of no more than 500° Fahrenheit with a temperature difference between the heat source and the working fluid of less than 5° Fahrenheit. The second piston reciprocates within a second cylinder, and has a first side (working side) and a second side opposite the first side. The first side and the cylinder define a working chamber containing working fluid. The second side of the piston and the cylinder define a second opposite chamber containing an opposing fluid. The working fluid in the second cylinder is cooled to a temperature of below 35° Fahrenheit.

81 Claims, 23 Drawing Sheets

EXTERNALLY HEATED ENGINE

TECHNICAL FIELD

This application is a continuation of U.S. application Ser. No. 11/198,681 entitled Externally Heated Engine filed Aug. 5, 2005 now U.S. Pat. No. 7,076,941. The present invention relates to externally heated engines. More particularly, the present invention relates to improvements in the efficiencies of externally heated engines operating at relatively low temperatures and pressures.

BACKGROUND OF THE INVENTION

Externally heated engines and, in particular, Stirling cycle engines have always held great promise, because their theoretical thermal efficiency approaches that of the Carnot Cycle. This efficiency is established in turn by the difference between the hot and cold temperatures of the cycle. Recent designers of such engines have sought to maximize efficiency by increasing the temperature of the hot side of the engine. In addition, they have utilized fine molecule gasses, such as helium and hydrogen, at very high pressures, to further optimize the power output of the engine. Their combined efforts have led to commercial failure. The high temperatures have required the use of materials which can withstand these temperatures. The practical problems, and enormous expense, of using materials such as titanium and special alloys of stainless steels have combined to make the engines impractical to manufacture, and expensive to own and operate. High pressure gasses and extreme temperatures have made the engine so complex that it has been placed out of the reach of all but the most sophisticated users.

The present invention takes a completely opposite approach. Through the combined use of several innovations, the design of a high efficiency, low temperature, simple engine becomes possible. Existing designs have used either plain cylinder walls as the heat exchanger, or a variation of the shell and tube type of air to air heat exchanger. Materials are typically steel or titanium, both of which are relatively poor conductors of heat.

To overcome these inefficiencies, the temperature differential between the air outside the cylinder, and the working fluid inside the cylinder must be very large to force the transfer of the necessary amount of heat in the very limited time available. This in turn forces the heat source itself to operate at an even higher temperature, and to be very tightly coupled to the heat exchanger. This tends to expose the external portions of the exchanger to even higher temperatures, which requires still more exotic materials.

Some prior art engines use liquid sodium as a phase change material, to get heat inside the cylinder more effectively. Aside from the great expense involved, there is complex technology needed to manufacture such devices. In addition, liquid sodium is very toxic and very hot, making it extremely dangerous to use. This technology is not suitable for use in a simple, mass-produced device.

An additional problem in the prior art engines concerns the temperature of the air sent to the regenerator. The extreme temperatures traditionally involved in the prior art make the use of common low temperature tubing, such as copper, impossible. This also applies to the materials used in the regenerator. Neither the outside of the regenerator or the material used in the regenerator matrix can be optimized for thermal performance, because the overriding concern is survivability at high temperature.

The problems of high temperatures completely dominate the design of a regenerator to be used in the prior art Stirling engines. This leads to significant thermodynamic losses, as well as greater expense, and reduced lifespan. The outside shell of the regenerator has to be made of high strength metals that will tolerate the high temperatures. This leads to high losses of heat to the environment, heat gained from the environment, and heat conducted from one end of the regenerator to the other. This heat conduction forces operation of the regenerator in a manner that is far from ideal.

The heat exchanger on the cold cylinder must efficiently remove heat from the working fluid, during the compression stroke. As with the hot side, prior art heat exchanger designs have used either the basic cylinder shape itself as the heat sink, or they have used simple finned surfaces or some variation of the shell and tube heat exchanger. In all such designs, the thermal resistance inherent in these approaches forces the heat sink to operate with a large difference in temperature ($\Delta T$) between the interior and exterior of the cylinder.

In other words, the working fluid inside the cold cylinder is forced to be at a temperature considerably above the outside temperature at which the heat is finally dissipated. This greatly reduces the $\Delta T$ across the engine, which limits the maximum efficiency and power output of the engine.

Since the Stirling Cycle is a closed thermodynamic cycle, the working fluid must be sealed inside the engine. This leads to several major design problems.

First, the prior art engines are forced to operate at high temperatures and pressures. This places great demands on the seals. To survive the high temperatures and pressures, the only practical approach has been to use sealing rings on the piston, as in conventional internal combustion engines. The piston and ring assemblies suffer leakage, or blow-by. This fluid loss from the engine is a critical problem, as it must continually be replaced to avoid loss of power output, and it disturbs the cycle. This usually means that the crankcase itself must be sealed as well, leading to problems of lost work in the crankcase, as the pistons do unwanted work on the crankcase gas. It also means that the crankcase must be filled with the same working fluid as used in the engine itself.

The piston rings scraping up and down on the walls of the cylinder leads to further problems. The biggest of these is the friction created. In a typical engine this can consume some 20% of the engine's output, a very serious loss.

A further problem is that of lubrication. Liquid oils cannot be simply sprayed onto the cylinder walls, as this would leak into the working area of the engine and contaminate the working fluid. This would lead to problems involving unwanted contamination, corrosion, and loss of efficiency. But without adequate lubrication, the friction losses become even greater.

The present invention solves all these problems found in the prior art designs.

SUMMARY OF THE INVENTION

Briefly described, the present invention includes an externally heated engine having at least two pistons. A first piston reciprocates within a first cylinder. The first piston has a first side (working side) and a second side opposite the first side. The first side of the first piston and the first cylinder define a first working chamber containing working fluid, which may consist of any usable gas. The second side of the first piston and the first cylinder define a first opposite chamber containing an opposing fluid. A heater heats the working fluid in the working chamber. Preferably, the chamber is heated by a heat source so that the working fluid has a temperature of no more than 500° Fahrenheit with a temperature difference between the heat source and the working fluid of less than 5° Fahrenheit. The working fluid may be heated with a heat exchanger or heat injector. Heated fluid is delivered to the heat injector and flows through grooves around thermally conductive material, thus injecting heat directly into the engine. The heat is trapped inside the engine by the thermally insulating material. The working fluid flows in the longitudinal direction through the thermally conductive material. The thermally conductive material has passageways so that the working fluid may pass longitudinally through it. The longitudinal passages for the working fluid are narrow and run the entire useable length of the heat injector.

Preferably, the heat injector has grooves for the heated fluid which include multiple, parallel grooves which form a spiral or helical pattern along the entire outside useable length of the heat injector. The spiral grooves could be in sets of 2, 3, 4 or more, running parallel to one another and into which the heated fluid is injected simultaneously. By keeping these grooves very narrow and deep, a very high value of length to depth and thus low temperature differential is achieved, while providing adequate useable cross-sectional area to permit a sufficient volume of heated fluid to flow and provide heat input.

The grooves and passages are separated by a solid layer of the conductive material. The heat injector of the present invention is described more fully below.

Another method of heating the working fluid is through the use of heat pipes. Heat pipes are tubes which rely on phase change of a fluid within the pipes to transfer heat. Through the change from liquid, to gas and back to liquid, heat is transferred from one end of the pipe to the other. The heat pipes may pass through the wall of the first cylinder and fill the space in the cylinder beyond top dead center of the piston. Thin copper fins may be attached to the heat pipes outside of the cylinder. Hot air is swirled through the heat exchanger area, creating a very effective exchange of heat between the hot air and the heat pipes. Instead of the usual 25° to 45° Fahrenheit temperature difference ("ΔT") between the air and the metal of the heat exchanger, a ΔT of only some 5 degrees will exist.

In the heat pipes, the heat travels along the length of the pipe, directly into the interior volume of the cylinder. As is usual in a heat pipe design, a negligible ΔT exists along the length of the pipe. This means that the heated copper inside the cylinder is within only 5 degrees of the temperature of the hot air outside. The externally heated engine may include a heating medium surrounding the heat pipes which is heated with thermoelectric generators.

Preferably many small heat pipes are used. These have a small diameter, and since there are so many packed into a small volume, there is only a very limited dead volume associated with the heat exchanger. Furthermore, the ΔT between the copper and the working fluid inside the engine is held to an absolute minimum by this design.

The second piston reciprocates within a second cylinder, and has a first side (working side) and a second side opposite the first side. The first side and the cylinder define a working chamber containing working fluid. The second side of the piston and the cylinder define a second opposite chamber containing an opposing fluid. The working fluid in the second cylinder is cooled to a temperature of below 35° Fahrenheit.

Preferably, the engine includes diaphragms associated with the pistons to separate the working chambers from the opposing chambers. The diaphragm provides many benefits as will be described in detail below. Because of the use of the diaphragm, it is beneficial to control the pressure of the opposing fluid. This prevents a large pressure differential across the diaphragm, which, if uncontrolled, could cause it to burst. A second reason is to vary the pressure on the opposing side in concert with the action of the engine's throttle control. That is, as working fluid pressure is raised and lowered, the same is done with the opposing fluid, to avoid doing unwanted work on the gas in the opposing chamber and to protect the diaphragm.

The working fluid pressure is controlled as a means of throttling the engine. As more working fluid is forced into the engine, by increasing its pressure with the control system, the engine will increase its power output, because the greater volume of working fluid will transfer more heat into and out of the engine cycle and thus do more work. Reducing the pressure will have the opposite effect. In this way, engine output can be continuously varied, to match the load conditions. Having too large a throttle setting when the load is reduced would be inefficient because the engine would overspeed, and excess heat would be drawn in and dumped to the chiller.

In order to force the greatest possible percentage of the working fluid in the engine to participate effectively in the thermodynamic process, this air must be swept alternatively all the way through the engine, from hot side to cold side and back again. While steps are always taken (described elsewhere in regard to the heat injector, the heat extractor, and the regenerator) to reduce unswept volume, the piston characteristics are also controlled to reduce unswept volume.

In the two piston engine configuration, the stroke of the engine must be greater in length than the diameter of the bore. That is, the ratio of stroke length/bore diameter must be greater than one. The ratio could be much larger, as high as 2 or 3, or more, until practical limitations prevent further gains. Since a fixed dead volume space exists at the head of the piston even at end of stroke, making the stroke longer reduces this dead volume greatly as a percentage of total volume, and ensures that the swept volume is many times greater than the unswept volume. By doing this, the great majority of working fluid particles can be swept all the way through the engine and efficiency is enhanced.

In displacer type engines described in detail below, the same desirable effect is obtained by making the stroke, and thus the displacement by the displacer, as great as practical. This again ensures that the vast majority of working fluid contributes effectively to the process.

The preferred embodiment of the chiller system comprises a compression/expansion cycle refrigerant based system. It is designed to produce intense cold inside the engine, in the heat extractor, by evaporating (boiling) the refrigerant directly inside the engine in the extractor. Because the heat extractor is of a similar design to the heat injector, with a low temperature differential between the cooling fluid and the working fluid, the engine working fluid can be reduced in temperature to at least 50 degrees F. below zero. This adds perhaps 100 degrees of temperature differential between the hot and cold sides of the engine to the engine design, compared to conventional chilling methods.

Preferably, the chiller employs three compressors, three condensers, and three two speed cooling fans, which are controlled by the chiller controls. However, other numbers of compressors, condensers and cooling fans are possible. Only as much capacity is switched on at any given time as is actually needed by the engine. This greatly improves the engine power budget, and thus efficiency, by not using unneeded power.

As an alternative heat extractor, the externally heated engine may include heat pipes which pass through the cylinder wall of the second cylinder to cool the cylinder. The heat pipes may be cooled with thermoelectric coolers or any other suitable cooling method. The heat pipes may be surrounded by a heat exchanger medium which has a freezing temperature of below 32° Fahrenheit, such as brine, methanol, ethylene glycol, or other fluid with a freezing temperature below 32 degrees Fahrenheit. Instead of heat pipes, small tubes could be used to carry cooling fluid directly to the cylinder through the cylinder wall or preferably into passages in a heat exchanger as described more fully below. Cooling can be accomplished through any number of other ways.

A cold water jacket can surround the cylinder. In this way a certain amount of heat can be drawn out through the cylinder walls themselves. This also ensures that no stray heat can leak into the engine through this path.

In one embodiment, there are a large number of heat pipes installed through the wall of the cylinder, extending between the inside of the cylinder and the area of the cold heat exchanger. This ensures that the ΔT between the chilled cooling water and the interior of the engine is essentially negligible, thus reducing the cold working fluid temperature inside the engine to the lowest possible level.

Inside the cold liquid jacket, the heat pipes are attached to copper fins, to greatly increase the heat transfer between the cold liquid and the heat pipes. The cold liquid is pumped into a lower corner of the jacket, and is made to swirl through the area. This significantly further increases the heat transfer. To cool the liquid, a chiller system or thermoelectric coolers (Tec) may be used.

The operating temperature of the heat extractor is made as low as possible, by holding the operating pressure of the expanding refrigerant to the lowest possible value, consistent with the limits of the design.

By making the cold side very cold, the temperature difference is increased between the cold and hot sides, so that the hot side does not have to exceed 500 degrees Fahrenheit.

A thermoelectric cooler uses electricity to pump heat from the cold side to the hot side, in the manner which is well known. The Tec's in the chiller will be powered by some of the energy produced by the engine. This is accomplished in part by using thermoelectric generators (Teg) on the hot engine exhaust, and in part by using some of the electricity produced by a generator connected to the engine. Bonded-fin, copper heat sinks and forced air cooling are used on the hot side of the Tec's. The heat sinks have a thick copper plate that has been machined to the proper degree of flatness and finish. These can be readily obtained from ERM Thermal Technologies in Ontario, N.Y.

Secondly, only a small portion of the heat pumping capacity of each Tec is used, as this enormously boosts efficiency.

The ΔT between the hot side and the cold side of the Tec's is limited. If desired, the temperature can be limited by a simple, inexpensive, passive use of geothermal cooling. A moderate length of pipe may be buried several feet below the surface, and the cooling air is pumped through this pipe prior to use. As is well known, the temperature of the earth at this depth is approximately a constant 50 degrees F. This means that the hot heat sink is cooled with 50 degree air. In the winter, one could use even colder cooling air to great effect.

The working fluid reciprocates between the cylinders in a closed fluid path. A closed fluid path means that during normal operation, fluid reciprocates between the pistons, compared to an internal combustion engine, for example, which continually intakes combustion air and exhausts combustion byproducts to the atmosphere. The closed fluid path in the present invention does allow for the introduction of additional working fluid when necessary and for pressure control as described below.

A pressure differential is maintained between the working fluid and the opposing fluid in the first cylinder of between 4 PSI and 250 PSI. By maintaining pressurized opposing fluid, a higher working fluid pressure is possible while maintaining the integrity of the diaphragm. In addition, the opposing fluid aids in the compression stroke by reducing the work necessary to compress the working fluid. However, the pressure of the opposing fluid is not so high that it interferes with the power stroke. The externally heated engine may have the working fluid at a pressure of below 10 atmospheres. The externally heated engine may have the working fluid at a pressure of greater than 60 PSI.

A regenerator is provided within the closed fluid path. The regenerator is a temporary repository of heat during certain cycles of the engine. Because the temperatures are lower than in engines of the prior art, the present invention employs a shell made out of polytetrafluoroethylene material. This material does not conduct heat. Thus there is no thermal short circuit around the mesh. In prior art regenerators operating at extremely high temperatures, only all-metallic internal components could be used. Since each layer of such metallic mesh touched both adjacent layers, a continuous, thermally conductive path was established from the hot side of the regenerator to the cold side. This resulted in a continuous loss of high temperature energy over to the cold side.

In the present invention, the regenerator operates at low enough temperatures to allow the introduction of non-metallic layers of mesh. Preferably, non-metallic mesh layers are used after every 10 or so metal layers. These non-conductive layers break up the conductive path, and thus prevent the unwanted loss of energy from the hot side to the cold side of the regenerator. In addition, since the non-metallic mesh layers can be made, for example, of woven fiberglass, they have enough thermal capacity to add slightly to the heat retention capacity of the regenerator, further adding regenerating action without adding unwanted, unswept volume.

Preferably, in addition to the metallic mesh layers and insulating mesh layers in the regenerator, a third type of layer is used. Specifically, a thicker, copper layer, which is solid with a pattern of larger openings can be used. The openings are arranged to break up and redistribute the air flow within the regenerator to ensure that the entire mesh content is fully utilized efficiently. The thicker copper also retains some additional heat, which adds further to the regenerating capacity.

The regenerator does not need stainless steel wire in the mesh as with prior art regenerators, but may include copper wire, which is far more conductive than steel. Silver may be used as an alternative to copper, for even higher performance. The copper mesh may be coated with diamond and may include a high melting point thermal insulating polymer such as polytetrafluoroethylene in the form of an outer cylinder and a center core. The regenerator may include a perforated disk constructed from a diamond copper composite. These choices allow the use of less mesh, with a consequent reduction in pumping losses.

The engine operates in the following manner. The heat applied to the hot side causes the working fluid, such as air, methane or another gas, to rise in pressure, and to expand. This forces the hot and cold pistons outward, thus doing useful work. The working fluid is then passed through the regenerator, on its way to the cold side. In the process it leaves behind much of its heat, which is temporarily stored in the regenerator mesh matrix. The fluid thus arrives in the cold cylinder much reduced in temperature.

Once in the cold cylinder, the fluid is compressed back to its original, smaller volume. This requires the removal of some heat, which is rejected to a recuperator. This heat is thus recovered and reused.

Finally, the fluid passes back through the regenerator to the hot cylinder. On the way it picks up the heat left behind in the regenerator mesh matrix. The fluid thus arrives in the hot cylinder at a much increased temperature and pressure. As further heat is added through the hot heat injector or exchanger, the fluid again enters an expansion process, thus beginning a new cycle of the engine. The first piston and the second piston are arranged to reciprocate such that the volume of the working fluid is compressed and expanded alternately to provide a ratio of the expanded volume to the compressed volume of greater than 2 to 1.

The externally heated engine may include a flexible rolling diaphragm attached to the pistons to create a seal between the piston and the cylinder. The diaphragm may be a standard, Type F, silicone diaphragm made by Dia Corn Inc. This diaphragm has virtually zero friction and zero break-away force. The diaphragm has no metal reinforcement and has a low melting temperature. Leakage is so slow as to be negligible. The unit is low cost, and will give up to a billion cycles in service.

The reason such a diaphragm can be employed in an externally heated engine is because of low temperature and pressure in the present invention. Without this, the high temperatures and pressures make the use of a diaphragm impractical. In prior art designs, a diaphragm would have to be made partly of thin, high temperature metals, with heat shielding. This would greatly increase friction and reduce service life, negating advantages of the diaphragm.

However, with the present invention, the diaphragm makes it possible to eliminate the main source of friction in the engine. That is, the piston rings are eliminated. A prior art Stirling engine will lose at least 20% of its output power to friction. The great majority of this friction is eliminated with the present invention. The diaphragm also eliminates the problem of leakage which is present with traditional piston ring seals. Because there is no leakage, the working fluid and opposing fluid do not mix, so that the working fluid does not become contaminated by the opposing fluid if those two fluids are not the same. The working fluid and opposing fluid need not be the same because of the perfect seal provided by the diaphragm. An opposing fluid such as dry nitrogen could be used, for example, to avoid oxidation and contamination of the volume enclosed in the bonnet. In addition, a light gas, such as helium, may be used as the working fluid, to obtain thermodynamic benefits, while still using a heavy gas such as air or nitrogen as the opposing fluid, thus avoiding the expense and difficulty of sealing the lighter gas on the opposing side, or providing quantities of it to make up for leakage.

Additionally, with the diaphragm, there is no need for lubrication in the cylinders, because the diaphragm is essentially frictionless. By eliminating lubricating oil, the working fluid does not become contaminated with lubricant.

BRIEF DESCRIPTION OF THE DRAWINGS

The present invention will now be described, by way of example, with reference to the accompanying drawings, in which.

DESCRIPTION OF THE PREFERRED EMBODIMENTS

Figures 1, 2, 3:
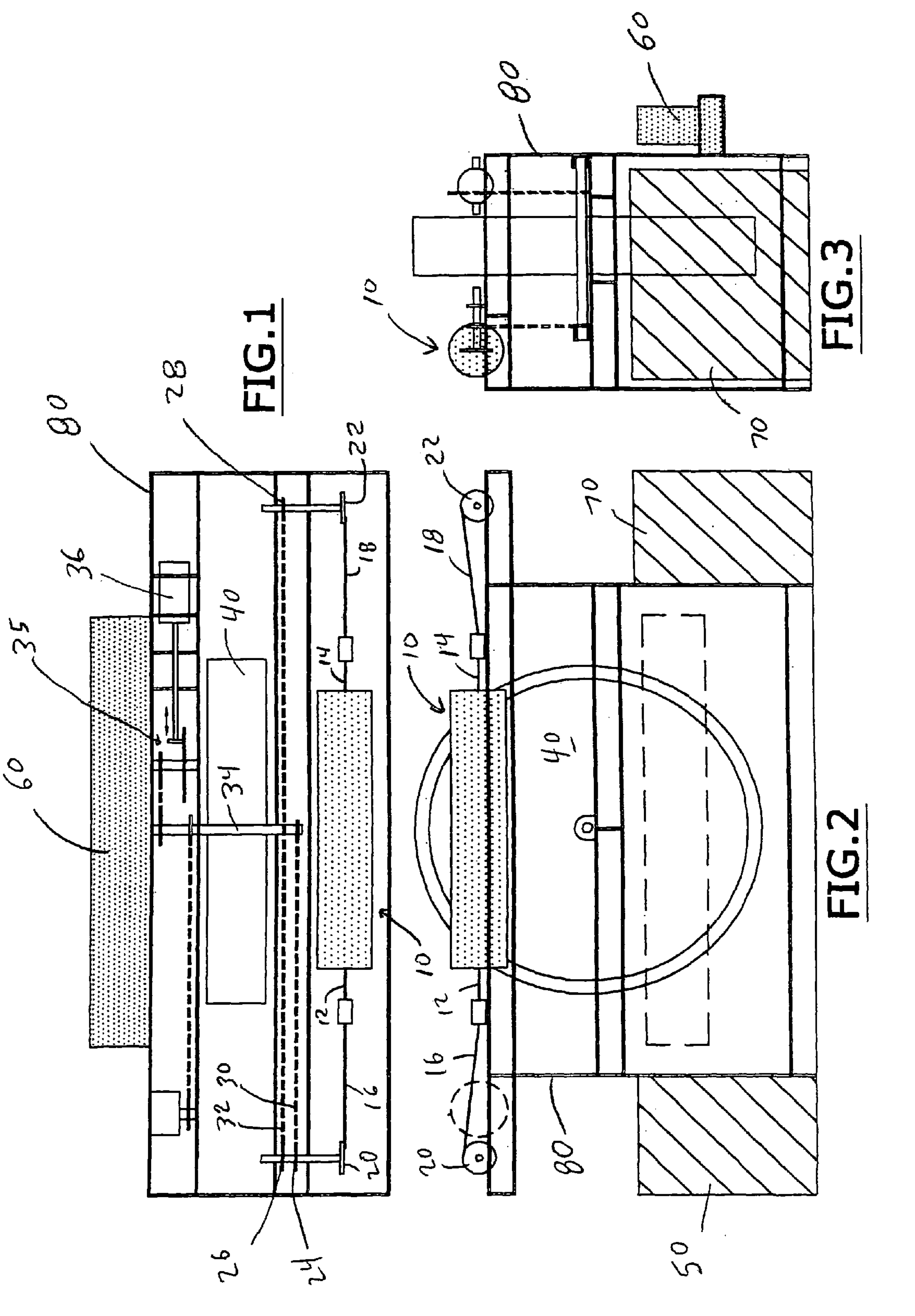
FIG. 1 is a simplified conceptual top plan view of the present invention.
FIG. 2 is a simplified conceptual front elevation view of the present invention.
FIG. 3 is a simplified conceptual side elevation view of the present invention.

FIGS. 1 through 28 show the present invention. More specifically, referring to FIGS. 1 through 3, a conceptual overview of the present invention is shown. A piston assembly 10 is provided which generates power. Rods 12 and 14 transmit this power through links 16 and 18 and through cranks 20 and 22. Through sprockets 24, 26 and 28 and chains 30 and 32, power is transmitted to shaft 34 and in turn fly wheel 40. Shaft 34 rotates and transmits power through transmission 35 to generator 36.

Chiller 50 cools a portion of the piston assembly 10 as will be described below. Burner 60 and heater 70 provide heat to the piston assembly 10, as will also be described below. The entire assembly is mounted on framework 80. One of ordinary skill in the art will appreciate that there are many equally feasible power transmission methods and physical arrangements of the various elements described. The foregoing description is meant to provide a conceptual overview and should not be viewed as limiting the invention.

Figure 4:
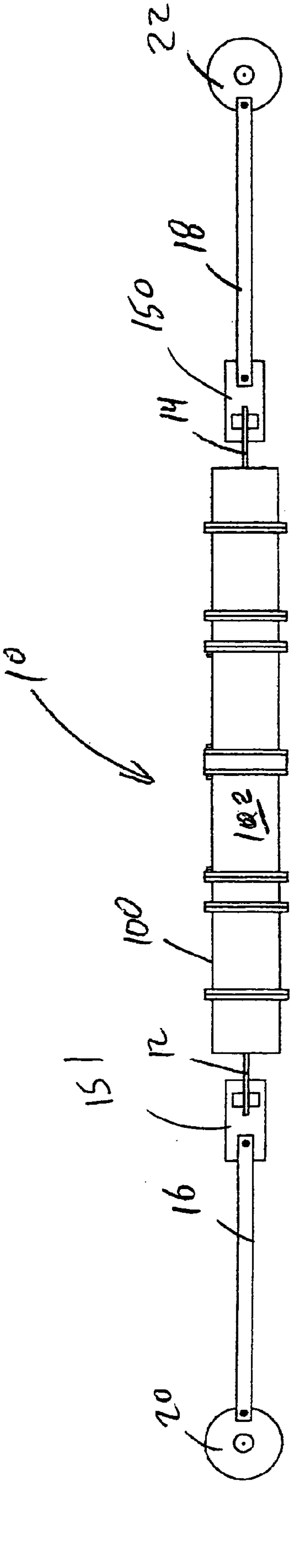
FIG. 4 is a front elevation view of the piston assembly of the present invention.
Figure 5:
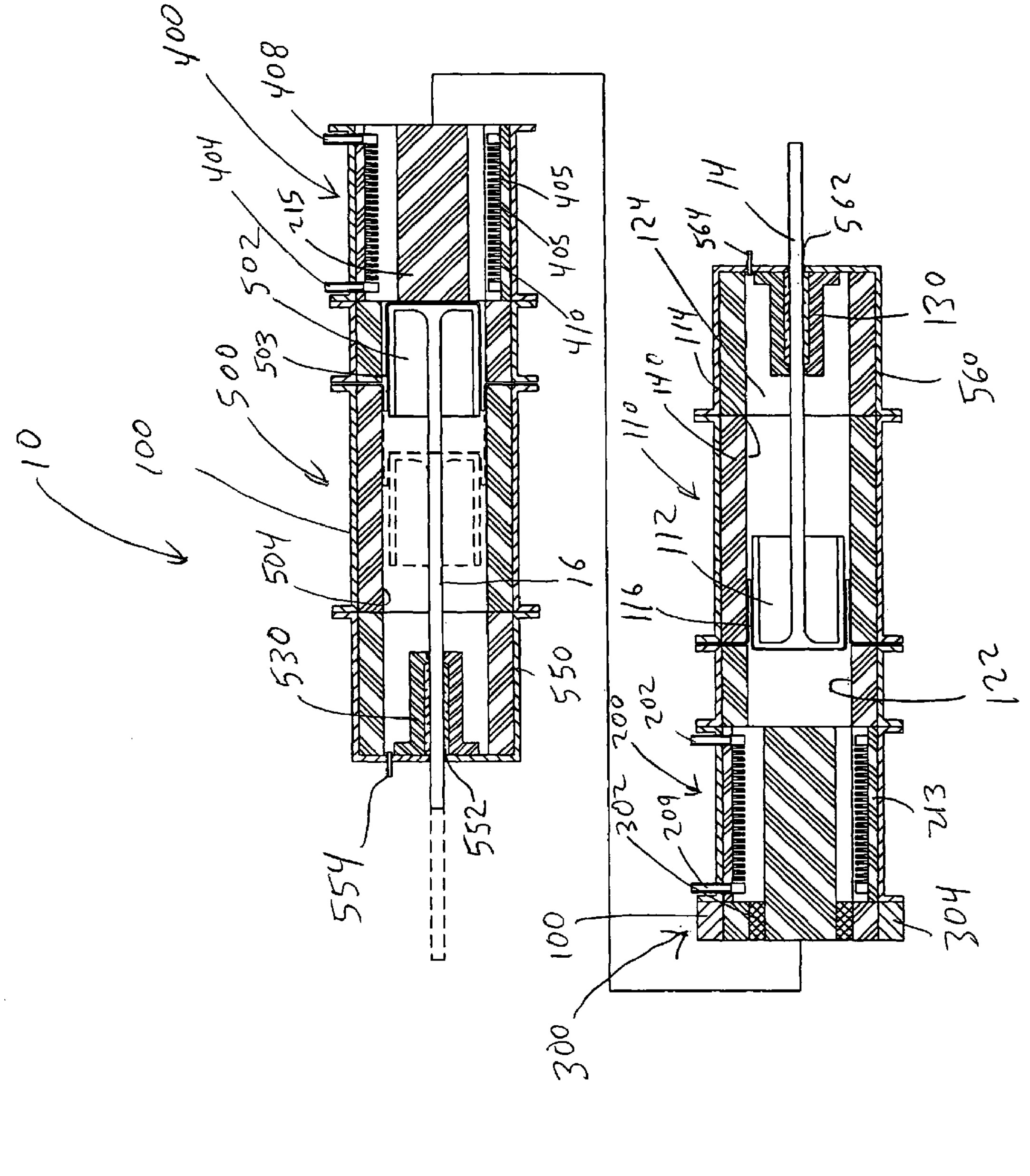
FIG. 5 is a cross-sectional view of the piston assembly of FIG. 4.

Turning to FIGS. 4 and 5, these figures show the piston assembly detail. The piston assembly 10 is contained in a bonnet or cylinder housing 100 with an outer surface 102. FIG. 5 shows a cross-sectional view of the piston assembly 10.

Figure 7:
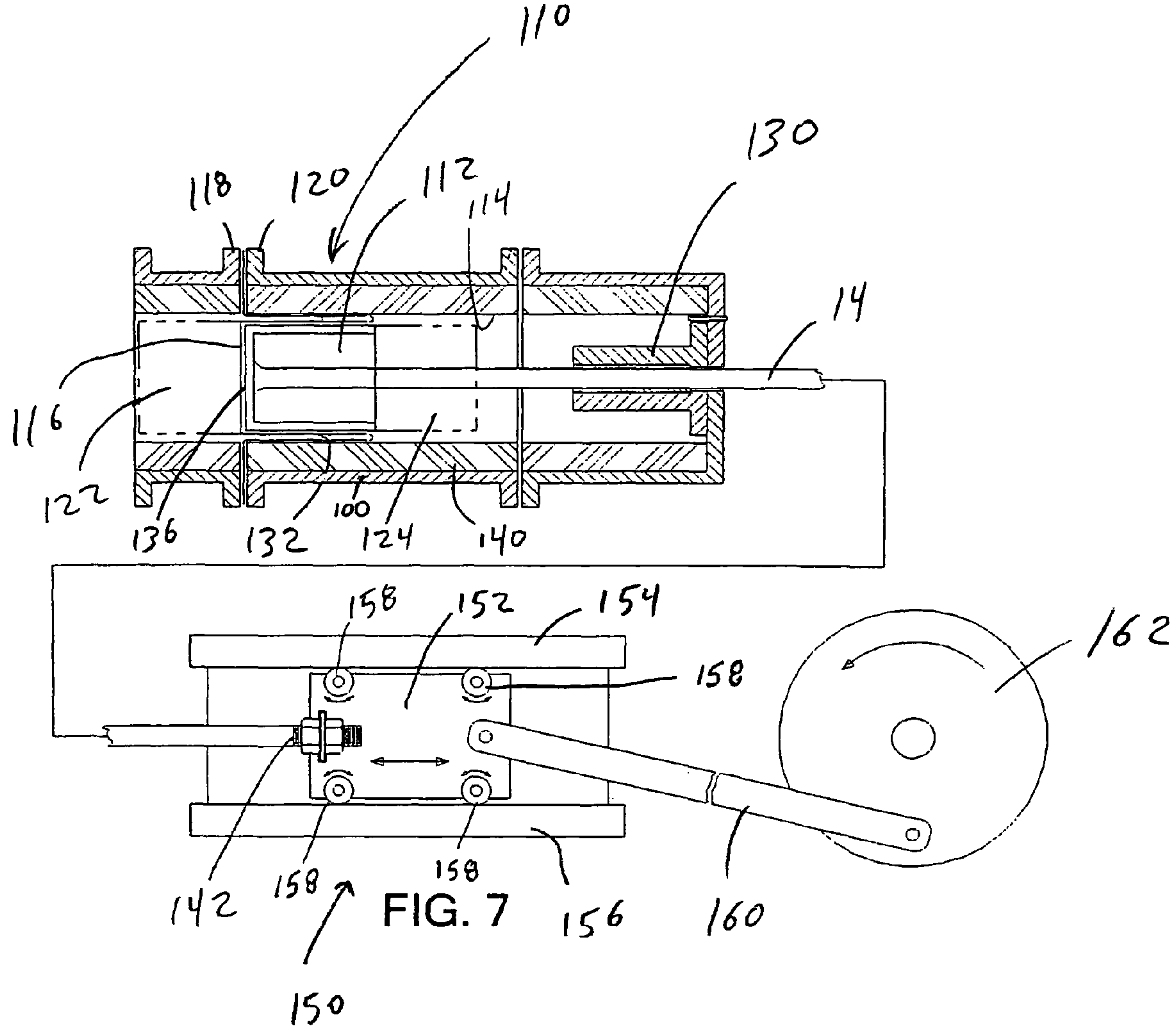
FIG. 7 is a cross-sectional view of a portion of the piston assembly of FIG. 4.

Referring to FIGS. 5 and 7, a first piston assembly 110 includes a piston 112 which is mounted for reciprocation in cylinder 114. Surrounding piston 112 is a rolling diaphragm 116. Rolling diaphragm 116 is held in place at flanges 118 and 120. The rolling diaphragm 116 defines the border between the working chamber 122 and the opposing chamber 124. The piston rod 14 facilitates reciprocation of the piston 112 and is held in proper orientation by bearing 130. As piston 112 reciprocates in cylinder 114, a turnaround point 132 of rolling diaphragm 116 moves within the cylinder 114. The rolling diaphragm 116 is attached to the front surface 136 of a piston 112 by any suitable means. Thus, the rolling diaphragm 116 forms a frictionless seal between the working chamber 122 and the opposing chamber 124. The cylinder 114 contains insulating material 140 to prevent energy loss through the cylinder housing 100. This insulating material may be made of, for example, polytetrafluoroethylene or other insulating material.

Piston rod 14 is attached at its opposite end 142 to slider assembly 150. Slider assembly 150 contains block 152 adapted for linear motion on rails 154 and 156. Wheels 158 allow sliding motion with respect to the rails 154 and 156. Slider assembly 150 eliminates any lateral forces from being placed on piston rod 142. Link 160 allows for the conversion of linear motion to rotational motion of crank 162.

Each end of the cylinder housing 100 is capped by a bonnet 550 and 560 which contains the opposing fluid. The bonnet 550 contains and supports the bearing 530 which controls the motion of the push rod 16. The bonnet 550 includes a seal 552 to contain the opposing fluid, and has an inlet port 554 through which the opposing fluid is introduced.

The bonnet 550 has limited surface area in the walls. Thus, the amount of force exerted on the walls by the action of the pressurized opposing fluid is limited. In addition, the bonnet 550 is exposed to relatively low temperatures and pressures. The bonnet 550 can be made of lightweight metal, such as aluminum, and need not have thick walls nor have stiffening ribs. The seal 552 can be of a type suitable for low temperature and pressure applications. The seal 552 supports only translational motion, not rotational which eliminates the problems associated with a crankcase in a traditional engine. The second bonnet 560 is attached to the cylinder 114 and includes a seal 562 and inlet 564.

The heat injector assembly 200 is shown in FIGS. 5, 6, 6A, 6B and 6C. Heated fluid (not numbered) is delivered through conduit 202 from heater 70 (FIG. 3). The heated fluid follows arrows 204 through grooves 205 around the thermally conductive material 212, thus injecting heat directly into the engine, and exits through conduit 209. The heat is trapped inside the engine by the thermally insulating material 213. The heat injector has a thermally insulating core 215. The working fluid (not numbered) flows in the longitudinal direction indicated by arrows 170 through thermally conductive material 212. Thermally conductive material 212 has passageways 210 therethrough so that the working fluid may pass longitudinally through it. Insulating material 213 surrounds thermally conductive material 212. The longitudinal passages 210 for the working fluid are narrow and run the entire useable length of the heat injector 200. Thus the passages 210 have a long length, and narrow depth, creating a high ratio of length to depth. This provides a low temperature differential between the working fluid, and the conductive material 212 of the heat injector 200. By also minimizing the width of these passages 210, unwanted excessive additions to the unswept volume of the engine are avoided.

The grooves 205 for the heated fluid include multiple, parallel grooves which form a spiral pattern along the entire outside useable length of the heat injector 200. By keeping these grooves 205 very narrow and deep, a very high value of length to depth and thus low temperature differential are achieved, while providing adequate useable cross-sectional area to permit a sufficient volume of heated fluid to flow and provide heat input.

The grooves 205 and passages 210 must be separated by a solid portion of the conductive material 212. If the engine operated at high pressure and temperature, then great strength would be needed in this layer, as it must serve as a pressure containment vessel. This would require that the thermally conductive material 212 be made of a relatively thick layer of a material such as stainless steel. This would lead to a very high temperature differential across this layer, as the heat was conducted into the engine through the layer.

However, since the engine operates at low temperatures and pressure, this is not necessary with the present invention. A very thin layer of the thermally conductive material 212 such as copper can be used. This makes the temperature differential negligible across this layer, while still adequately resisting the pressure.

Figures 14A, 14B, 14C, 14D:
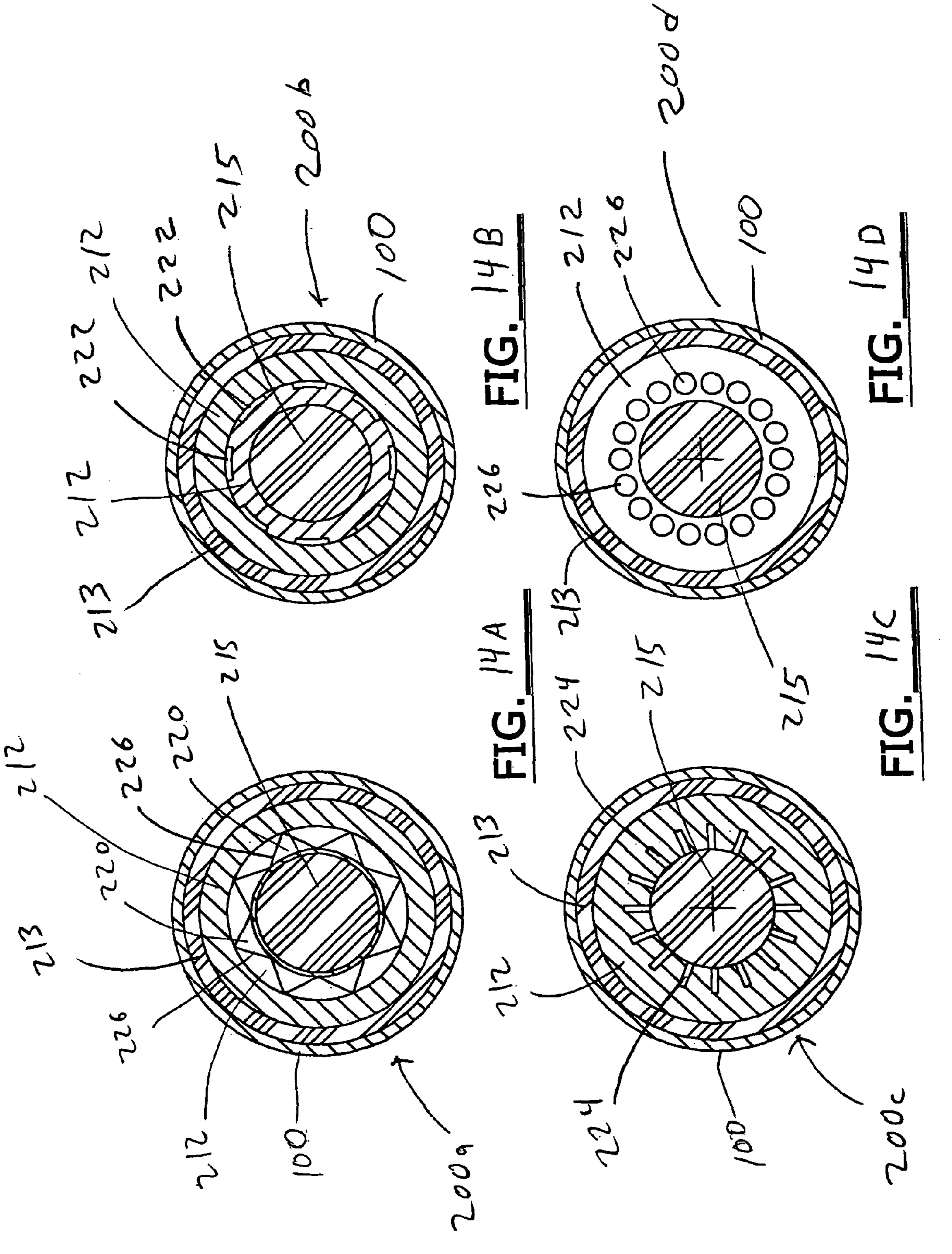
FIG. 14A is a cross-sectional view of one embodiment of a heat injector of the present invention.
FIG. 14B is a cross-sectional view of a second embodiment of a heat injector of the present invention.
FIG. 14C is a cross-sectional view of a third embodiment of a heat injector of the present invention.
FIG. 14D is a cross-sectional view of a fourth embodiment of a heat injector of the present invention.

As shown in FIGS. 14A-14D, the passageways through heat injectors 200*a*, 200*b*, 200*c* and 200*d* may take many configurations. FIG. 14A shows passageways 220 as triangular conduits formed by dividers 226. FIG. 14B shows passageways 222 as longitudinal conduits through thermally conductive material 212. FIG. 14C shows passageways 224 also as longitudinal conduits of an alternate, preferred configuration. FIG. 14D shows the conduits as longitudinal circular passageways 226. Each heat injector 200*a*, 200*b*, 200*c* and 200*d* has a thermally insulating core 215.

As shown in FIGS. 5, 6, 25, 26 and 27, a regenerator 300 has mesh 302 through which the working fluid flows. The mesh 302 may be made from copper, or copper coated with high thermally conductive material, such as diamond. Other types of materials, which are designed for rapid heat transfer may also be used. The layers of mesh 302 in the regenerator 300 are surrounded by a cylinder of insulating material 350, such as polytetrafluoroethylene or other insulating material and are contained within housing 100. This prevents heat gain or loss to the environment. And it additionally prevents heat conduction from the hot end 352 of the regenerator to the cold end 354.

Pressure containment, mechanical strength and mounting are provided for by an outside cylinder 100 of, preferably, aluminum, with suitable mounting features. The polytetrafluoroethylene 350 insulates this outside cylinder 100 from the mesh 302.

The regenerator includes a center insulating core 360. This is comprised of a solid, relatively large diameter rod of polytetrafluoroethylene or similar material. The center diameter of each layer of mesh 302 is punched out, to fit over this core 360. Since the core 360 is non-conductive, it contributes no heat loss. The regenerator 300 also includes copper disks 362 with holes 363 (FIG. 28) to provide turbulent flow of fluid through the regenerator 300. The holes break up and redistribute the flow of fluid to effectively utilize the thermal capacity of the copper mesh 302. Insulating disks 364 are also provided to prevent heat transmission through the layers of mesh 302 in the direction of fluid flow.

By making the core 360 of the regenerator 300 solid, the total volume of mesh 302 is kept to the proper size—no larger than it needs to be—to prevent unwanted unswept volume in the engine while the outside diameter of the mesh is kept large—the same as the rest of the engine—so that there is no discontinuity in the air flow passage diameters that would lead to very high loss disruptions of the fluid flow.

Figure 6A:
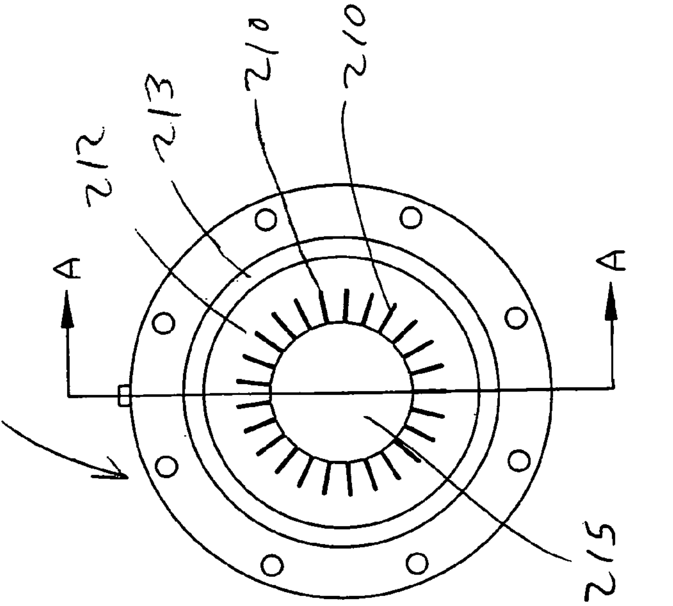
FIG. 6A is an end view of the portion of the piston assembly shown in FIG. 6.
Figure 6:
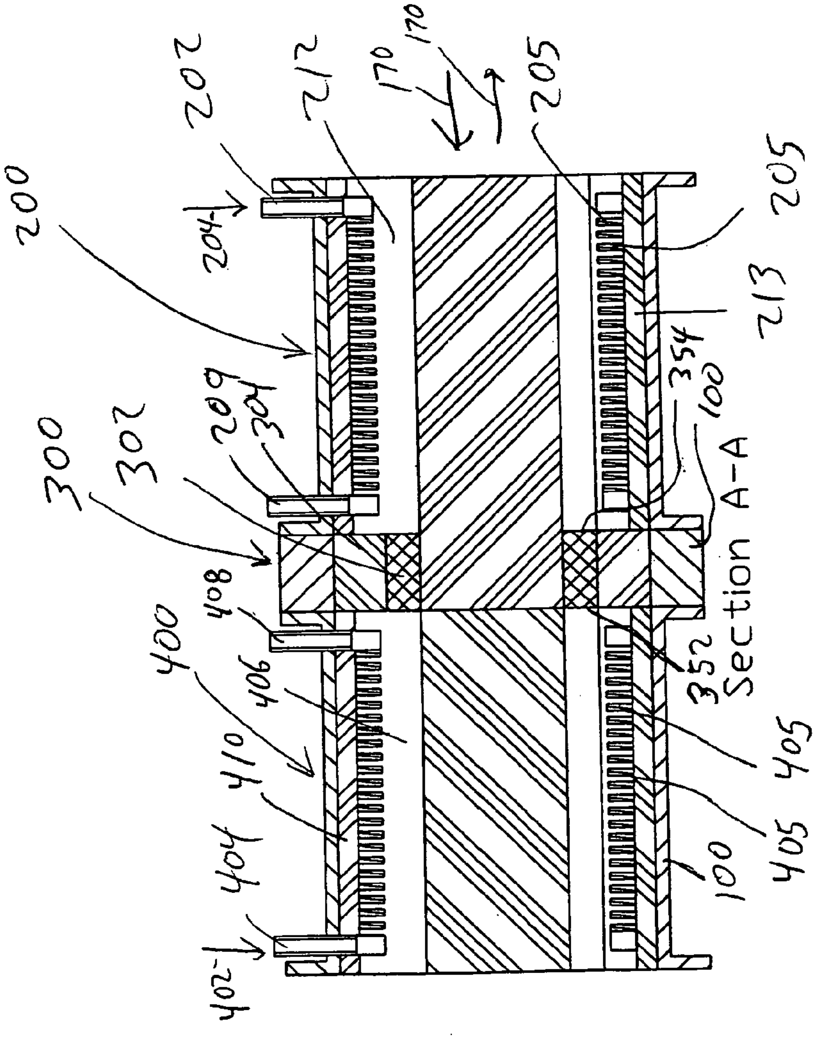
FIG. 6 is a cross-sectional view of a portion of the piston assembly of FIG. 4.
Figure 6B:
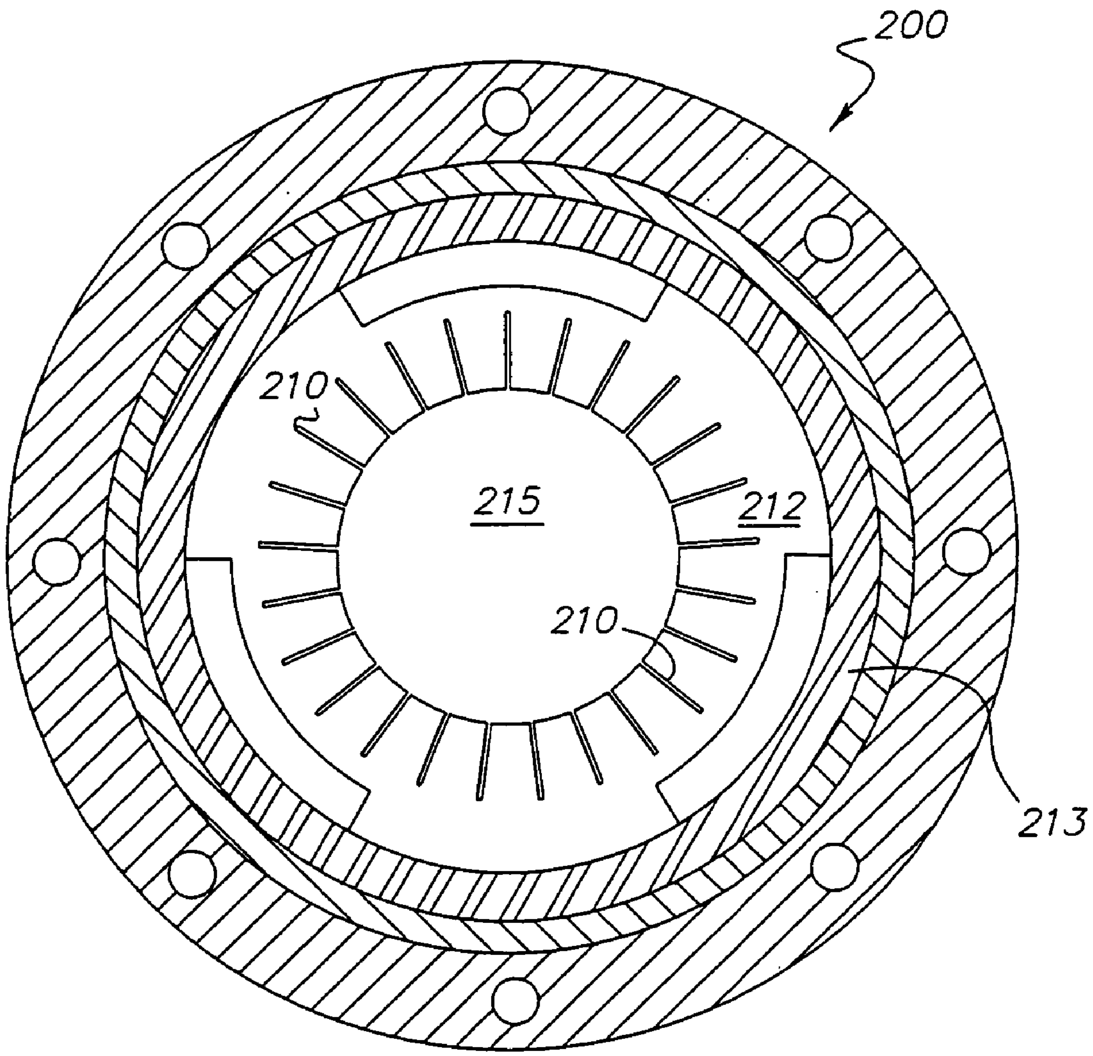
FIG. 6B is a cross-sectional view of the heat injector portion of the piston assembly of FIG. 4.
Figure 6C:
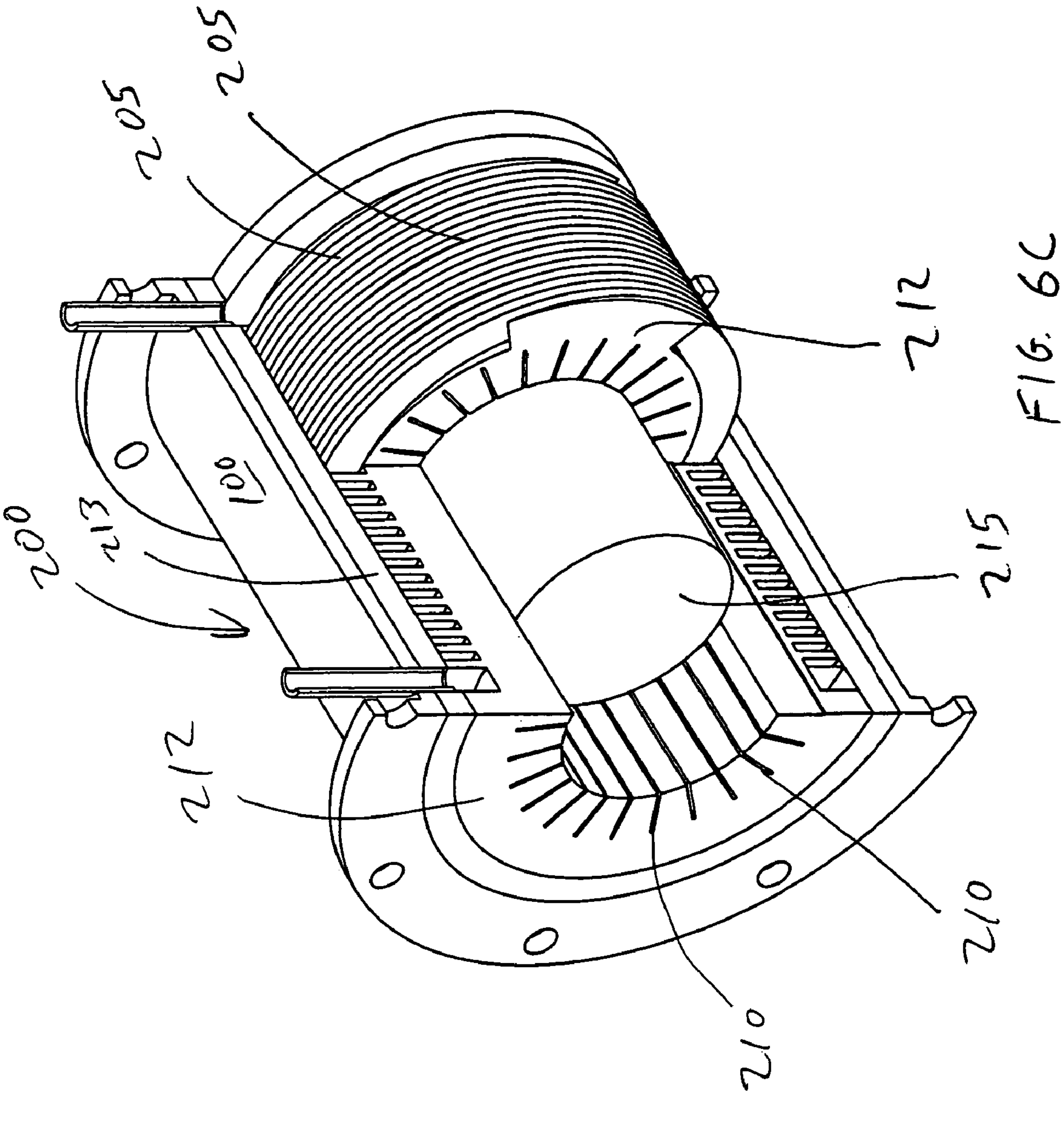
FIG. 6C is a partial cross-sectional perspective view of the heat injector portion of the piston assembly of FIG. 4 with portions cut away.

The heat extractor 400 is shown in FIGS. 5 and 6. The heat extractor 400 removes heat from the working fluid. The heat extractor 400 operates in a manner similar to the heat injector 200. The heat extractor 400 has longitudinal passageways which may be constructed in a way similar to those shown in FIGS. 14A through 14D. Cold fluid (not numbered) from the chiller 50 is injected through conduit 404 in the direction of arrow 402 and circulates around the outside of heat exchange material 406 through spiral passages 405, in a manner similar to that described with respect to the heat injector 200. The cold fluid exits out of conduit 408 and returns to the chiller 50. The heat extractor 400 is surrounded by insulating material 410, such as polytetrafluoroethylene or other insulating material and housing 100. One type of cold fluid which can be used is liquid refrigerant. The liquid refrigerant boils in the passages 405, absorbing heat from the heat exchange material 406. In this manner, the heat exchange material 406 may be cooled to well below zero degrees Fahrenheit.

The second piston assembly 500 is shown in FIG. 5. It operates in an identical manner to the first piston assembly 110. It includes a piston 502, a diaphragm 503 and a cylinder 504. A bearing 530 holds piston rod 16 in place.

A simplified slider assembly 151 is shown in FIG. 4 and it operates in a manner similar to the slider assembly 150 (also simplified in FIG. 4). A more detailed description of slider 150 is described in connection with FIG. 7.

Figures 8A, 8B, 8C, 8D:
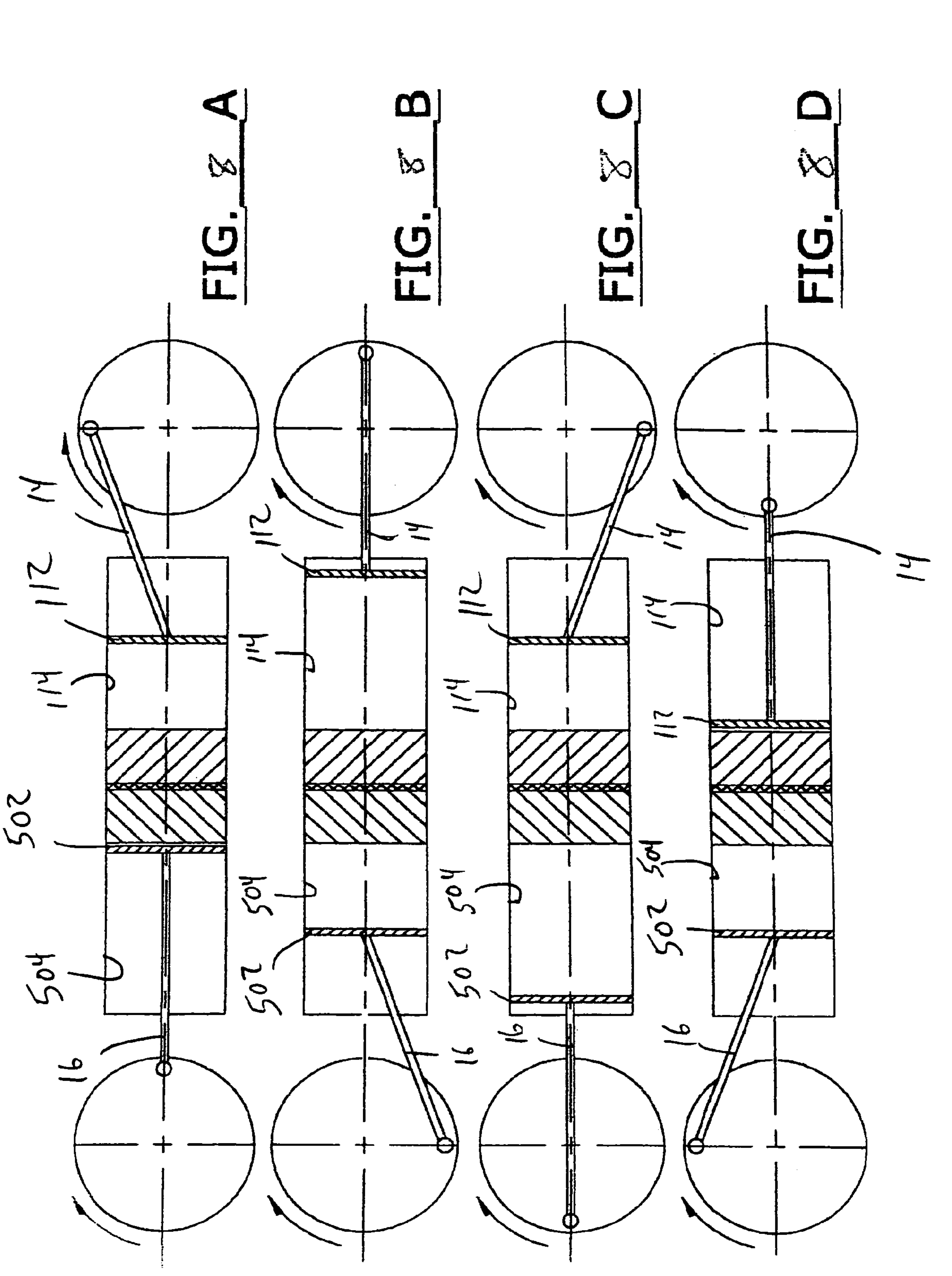
FIG. 8A is a simplified schematic of a first phase of the piston assembly of the present invention.
FIG. 8B is a simplified schematic of a second phase of the piston assembly of the present invention.
FIG. 8C is a simplified schematic of a third phase of the piston assembly of the present invention.
FIG. 8D is a simplified schematic of a fourth phase of the piston assembly of the present invention.

FIGS. 8A through 8D represent the four phases of the engine. While the phases of the pistons are shown correctly in FIGS. 8A though 8D, the pistons are not necessarily shown in their correct phase relationships in the other figures herein. The piston 112 and the piston 502 are always kept 90 degrees out of phase through appropriate mechanical linkages. In FIG. 8A, all working fluid has been forced out of the cold cylinder 504, and its piston 502 is in the fully compressed position. The hot cylinder 114 is shown with its piston 112 at the beginning of the power stroke.

In FIG. 8B, the cold piston 502 is moving to the left and is drawing working fluid into the cylinder. The hot piston 112 is at the completion of its power stroke.

In FIG. 8C, the cold piston is shown as completely withdrawn with the transfer of fluid to the cold side partially completed. The hot piston is partially through the transfer stroke.

FIG. 8D shows the cold piston partially through its compression stroke. The hot piston is shown after the transfer stroke has been completed.

Figure 9:
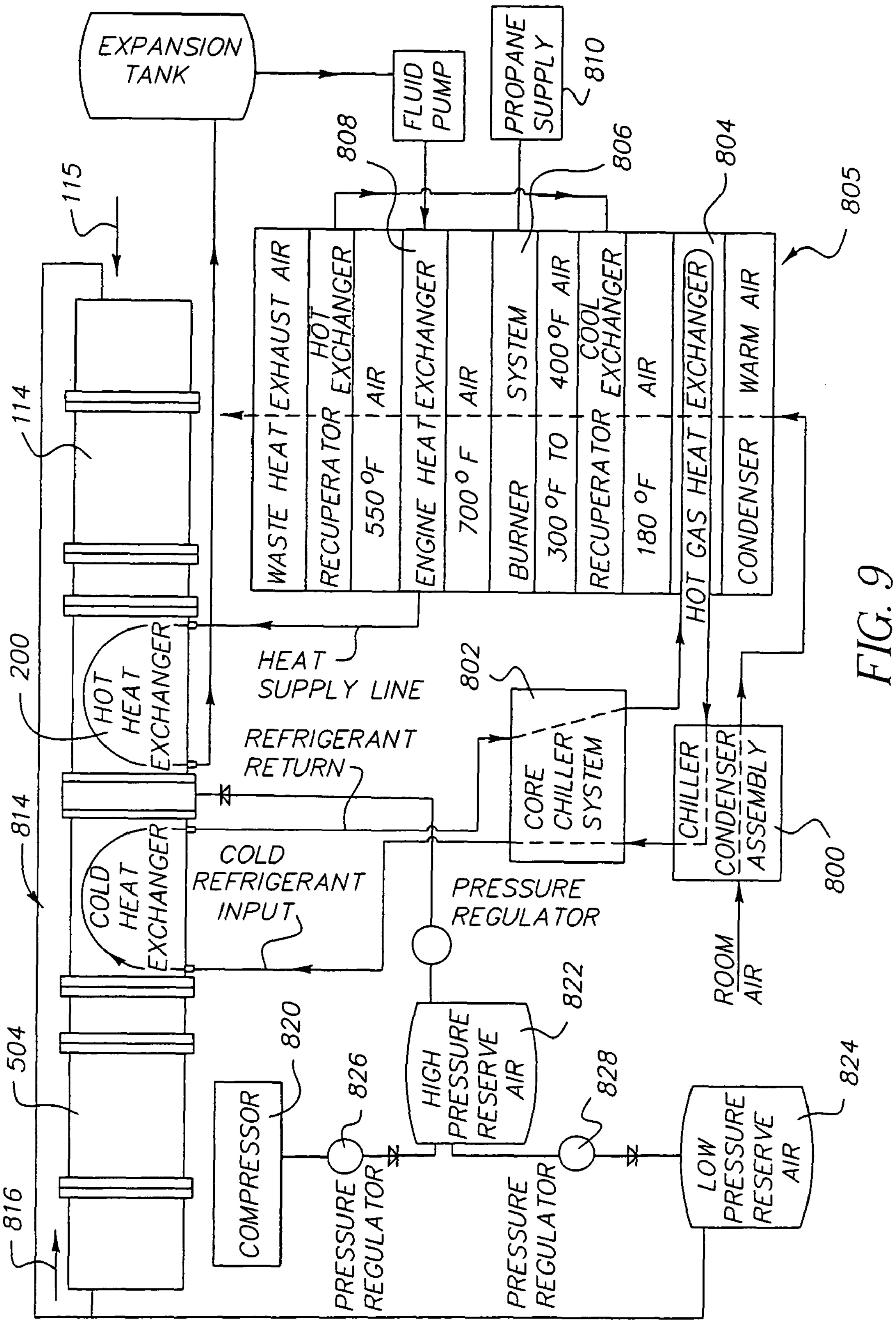
FIG. 9 is a schematic of the heating, cooling and pressurization systems of the present invention.
Figure 10:
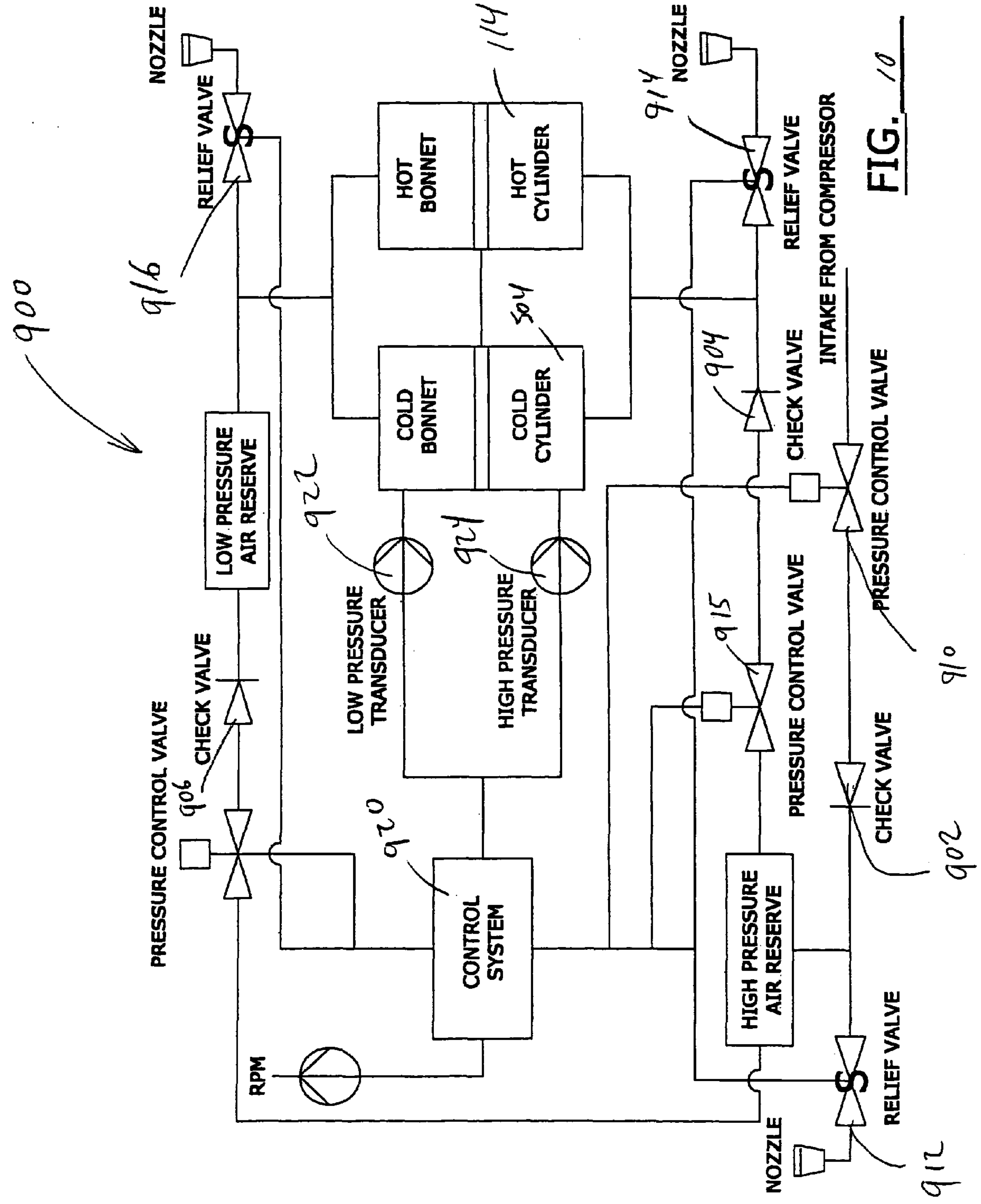
FIG. 10 is a schematic of the pressurization system of the present invention.
Figure 11:
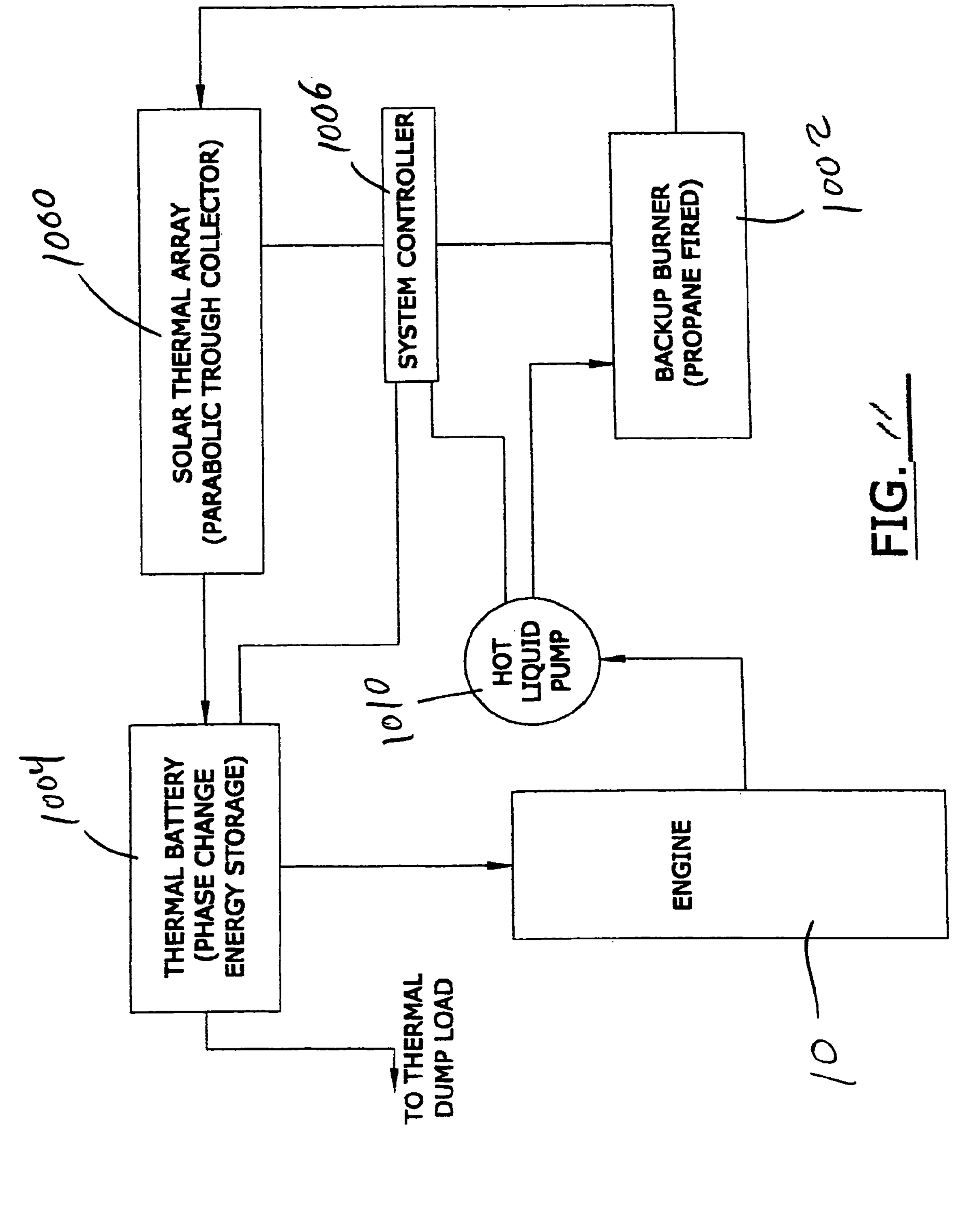
FIG. 11 is a schematic of the heating system of the present invention.

FIGS. 9 through 11 show schematic diagrams of the system. In FIG. 9, the chiller condenser 800 and the core chiller system 802 deliver cold fluid to the cold side 814 of the engine. Heat is extracted from the cold side 814 and delivered to the hot gas heat exchanger 804. Throughout the system, rejected heat is delivered to the recuperator assembly 805 (FIG. 9). The chiller condenser assembly 800 also delivers rejected heat to the hot side of the engine. This hot fluid is heated by the burner system 806 and delivered to another heat exchanger 808. The heat exchanger 808 delivers hot fluid to the heat injector 200 for the cylinder 114. The burner system 806 has a fuel supply 810.

A compressor 820 and pressure reserve 824 delivers pressurized opposing fluid to the cylinders 114 and 504. Pressure reserve 822 delivers high pressure working fluid to the engine. This preloads the engine with the proper amount of working fluid at the proper pressure. Pressure regulators 826, 828 and 830 are also provided to ensure proper operation of the system.

FIG. 10 is a schematic of the pressure control system 900. Air from the compressor 820 (FIG. 9) is delivered to the cold cylinder 814 and the hot cylinder 114. Check valves 902, 904, and 906 and pressure relief valves 910, 912, 914, and 916 and pressure control valve 915 are provided to ensure proper operation of the system. The pressure of the opposing fluid and the working fluid are regulated through a control system 920 and transducers 922 and 924 to maximize power output.

FIG. 11 shows a schematic of the heat injection system. A solar thermal array, such as a parabolic trough collector 1000 and a burner 1002 provide heated fluid to the system. A pump 1010 circulates the heat transfer fluid through the system. A thermal battery 1004 is provided to store excess solar heat collected during the day, for later use in the engine at night. Excess heat is stored by passing the heat through a bed of phase change material. When exposed to the heat, this material changes phase and in the process is able to store large volumes of heat, at a constant temperature. When running the engine from the stored heat, the phase change material gradually changes phase again and in the process provides back the stored heat, again at a constant temperature.

A system controller 1006 controls the operation of the heat injection system. Other heat generation and heat delivery systems are possible and are well within the skill of one of ordinary skill in the art to construct.

Figure 13:
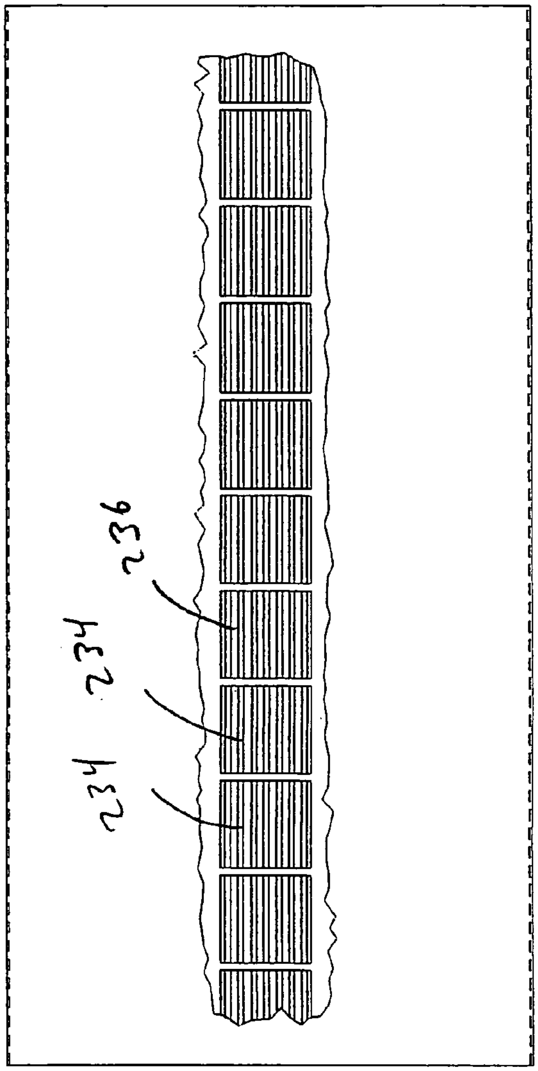
FIG. 13 is a side elevation view of the heat injector of FIG. 12 with a portion of the housing cut away.
Figure 12:
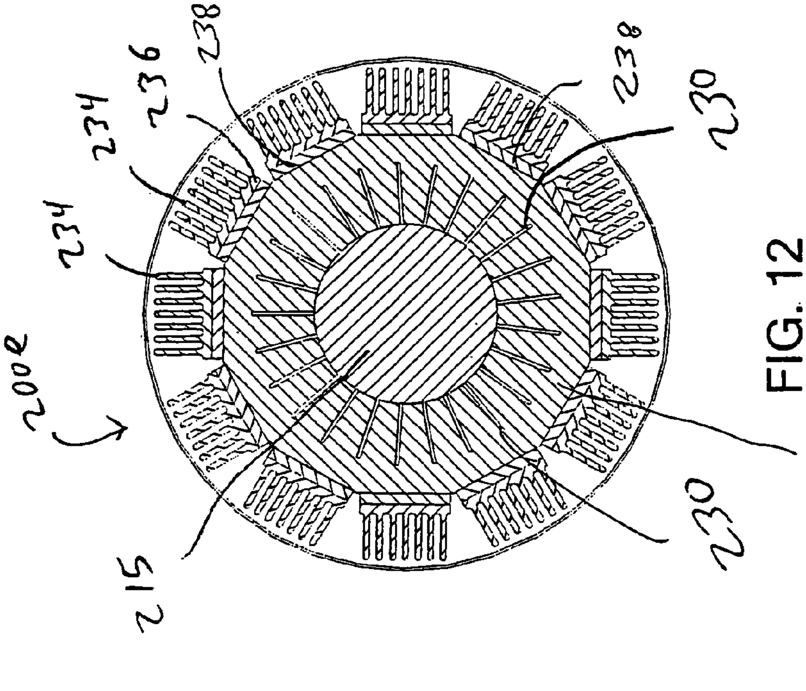
FIG. 12 is a cross-sectional view of a heat injector of the present invention.

FIG. 12 is a cross-sectional view of one embodiment of the heat injector 200*e*. FIG. 13 is a side view of the heat injector with a portion of the housing cut away. Working fluid travels through conduits 230 which extend through thermally conductive material 232. Heated fluid travels longitudinally between fins 234. Thermally conductive plates 236 assist in the transfer of heat from the heated fluid to the thermoelectric heaters 238. These thermoelectric heaters 238 pump this heat into the thermally conductive material 232. The center of the heat injector has an insulating core 215.

Figure 15:
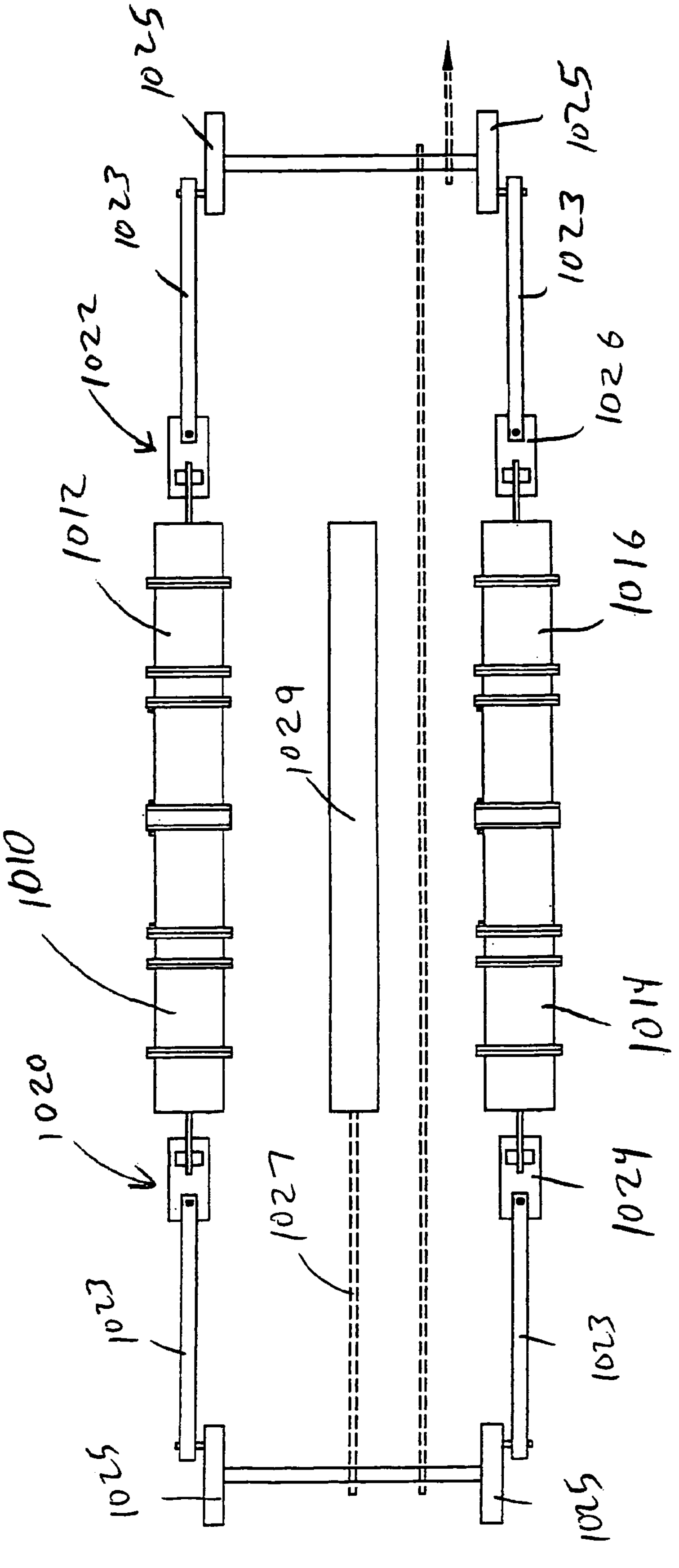
FIG. 15 is an alternate piston configuration of the present invention.

FIGS. 15 through 18 show alternative piston arrangements. The operation of the pistons, heat injectors, heat extractors and regenerators in these embodiments have been fully described above and need not be repeated here. FIG. 15 shows two pairs of cylinders, 1010, 1012, 1014, and 1016. This arrangement includes simplified slider assemblies 1020, 1022, 1024 and 1026, which operate in a similar way to the assembly of FIG. 4. Links 1023 drive cranks 1025. Chain 1027 is connected to flywheel 1029 in a manner similar to that shown in FIG. 1. It will be understood by one of ordinary skill in the art that additional cylinders could be added to this design.

Figure 16:
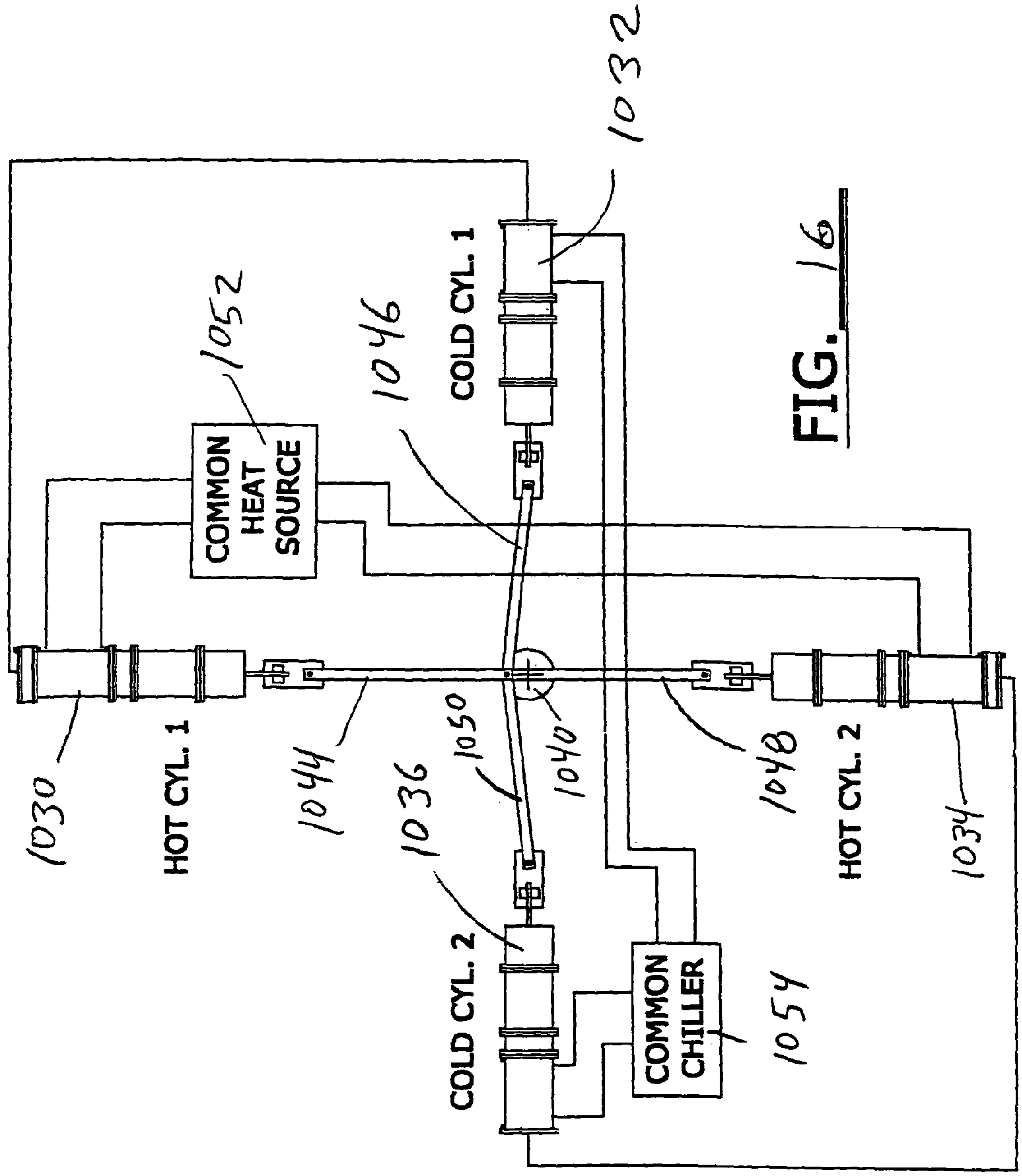
FIG. 16 is another alternate piston configuration of the present invention.

FIG. 16 shows another cylinder arrangement. In this configuration, four cylinders 1030, 1032, 1034, and 1036 are arranged radially, and are connected to a crank 1040 through links 1044, 1046, 1048 and 1050. A common heat source 1052 heats cylinders 1030 and 1034. A common chiller 1054 cools cylinders 1032 and 1036.

Figure 17:
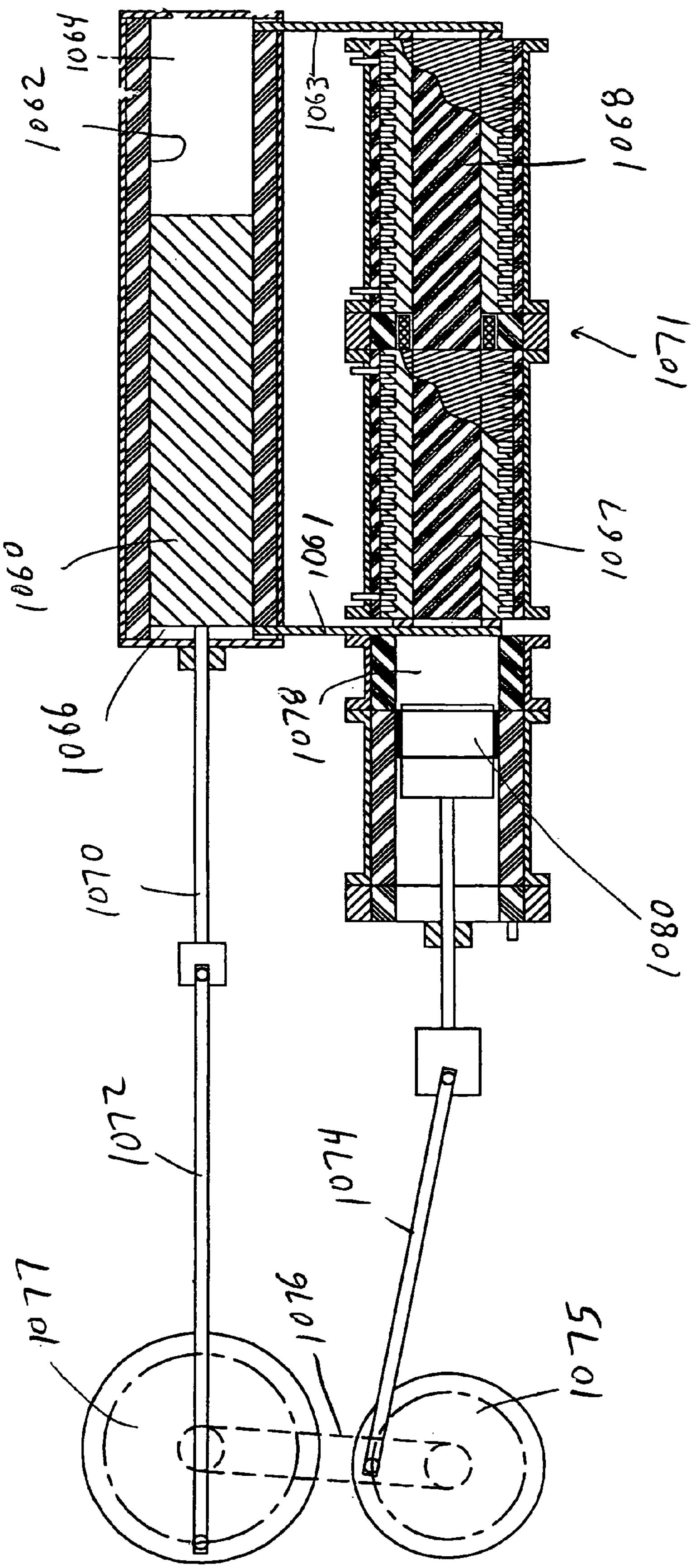
FIG. 17 is another alternate piston configuration of the present invention.
Figure 18:
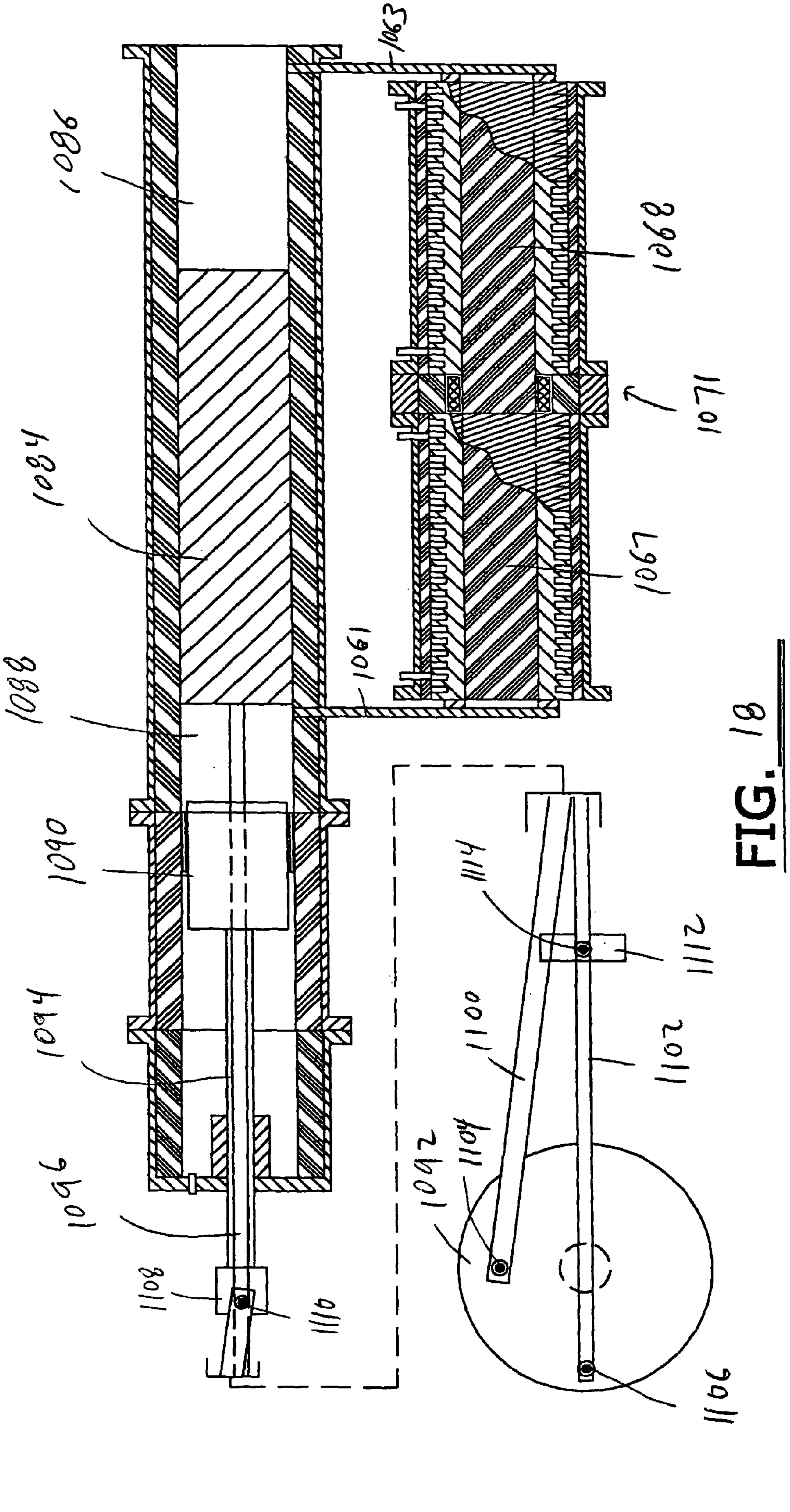
FIG. 18 is another alternate piston configuration of the present invention.

FIGS. 17 and 18 show two additional engine configurations. In FIG. 17, the engine includes a displacer or shuttle 1060, which is moved alternatively back and forth in its cylinder 1062. The displacer 1060 moves the working fluid alternatively from the hot end 1064 to the cold end 1066. Conduits 1061 and 1063 connect the displacer cylinders 1062 and 1066 to the heat injector 1068 and the heat extractor 1067.

As the air is displaced into the heat extractor 1067 of the engine, it passes through the hot heat injector 1068 last, and thus it reaches high temperature and pressure. A regenerator 1071 is provided which is identical to the regenerator described in connection with FIG. 6. The properly timed single piston 1080, connected by links 1070, 1072, and 1074 and a chain 1076, is then positioned in its cylinder 1078 to deliver a power stroke. Link 1074 drives crank 1075. Crank 1075 through chain 1076 drives crank 1077.

Next, the displacer forces the working fluid to the cold side 1066 of the engine. The temperature and pressure are thus greatly reduced. The piston 1080 is timed so that it is positioned ready to compress this low temperature and low pressure working fluid into a smaller volume, without having to do much work. The cycle then repeats.

In FIG. 18, the engine operates in a manner similar to the engine of FIG. 17. The displacer 1084 forces the working fluid alternatively between the hot 1086 and cold 1088 sides. The single piston 1090 is timed to deliver a power stroke when the working fluid is hot and at high pressure, and to deliver a compression stroke when the working fluid is cold and at low pressure.

The engine of FIG. 18 uses only a single crank 1092. To accomplish this, it is necessary to make one of the connecting rods 1094 hollow. The second rod 1096 runs inside the hollow first rod, and is able to move independently from it.

The single crank 1092 has two pins 1104 and 1106 on it, located the appropriate number of degrees apart. This correctly times the motions of the displacer 1084 and the piston 1090. The piston 1090 drives rod 1094, which through links 1100 and 1102 drive crank 1092. Links 1100 and 1102 are connected to crank 1092 through pins 1104 and 1106, respectively. Link 1100 is pivotably mounted to sliding block 1108, constructed in a manner similar to that of block 152 of FIG. 7, by pin 1110. Link 1102 is pivotably mounted to block 1112 by pin 1114.

With only a single crank 1092, and no chains, the engine of FIG. 18 can be more compact than the engine of FIG. 17.

Figure 20:
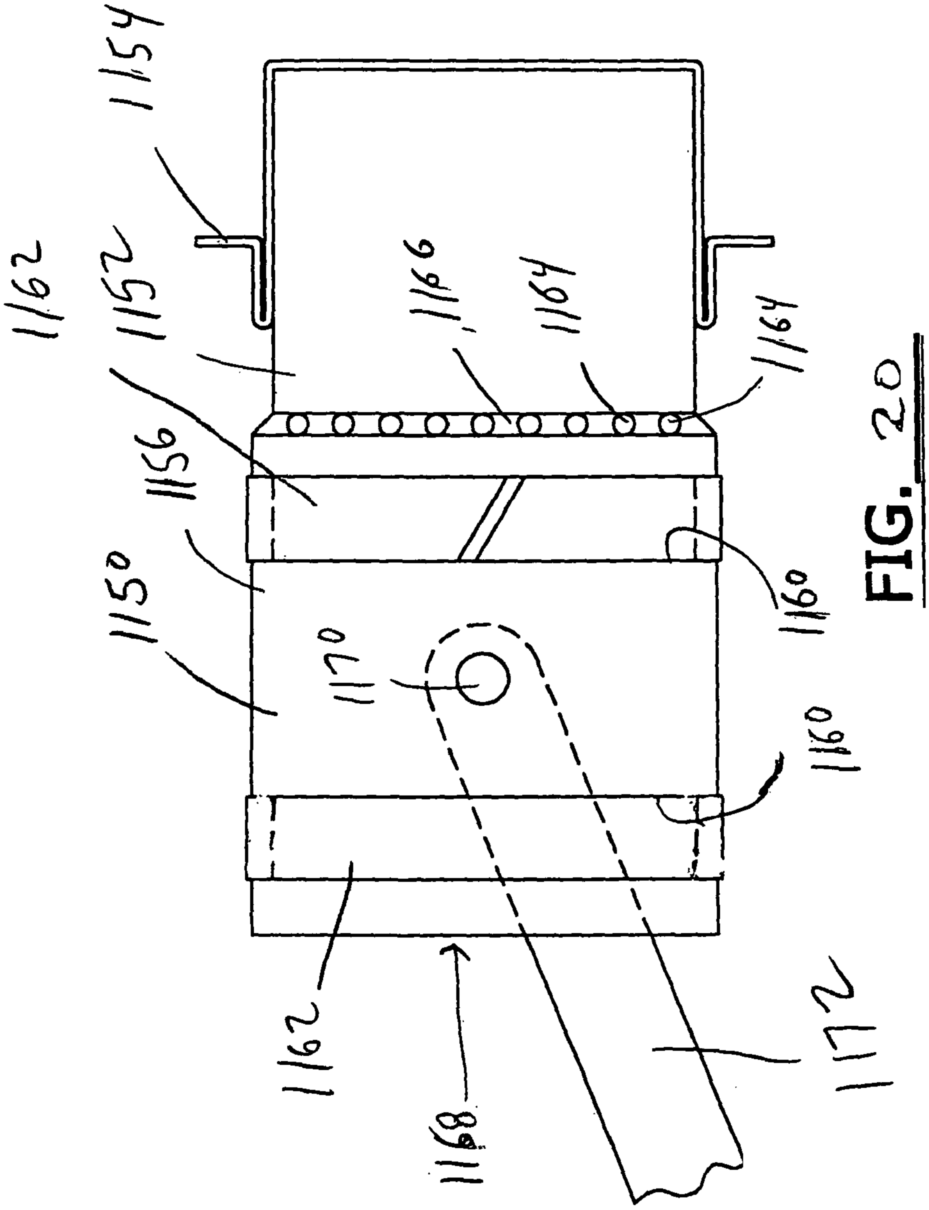
FIG. 20 is a side elevation view of an alternative piston of the present invention.
Figure 19:
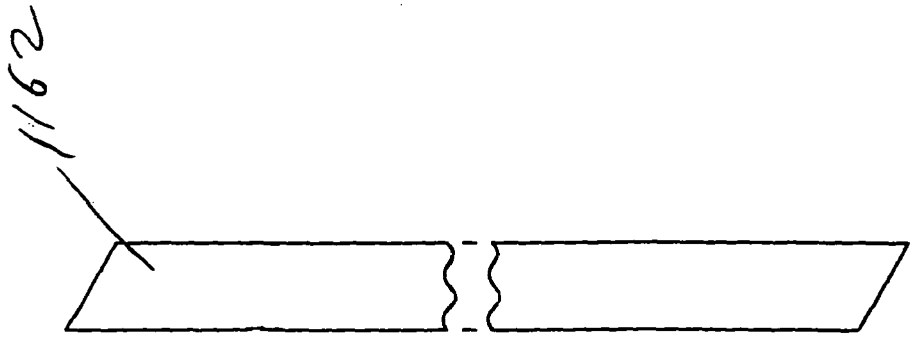
FIG. 19 is a view of a polymer ring used in connection with the alternative piston of FIG. 20, showing the ring prior to its installation on the piston.

In FIGS. 19, and 20, an alternate piston 1150 is provided. This piston is designed with two separate sections, one having a larger diameter than the other. The smaller diameter section 1152 at the head of the piston is sized to work with a rolled diaphragm 1154, in the same manner as the piston of FIG. 7.

The larger diameter section 1156 has two grooves 1160 machined into it. In each groove is fitted a ring of polytetrafluoroethylene 1162 or other low friction material. The rings 1162 are sized for a tight fit inside the cylinder (not shown). These two rings serve the dual purpose of bearings between the cylinder and piston 1150, and also locate the piston properly in the cylinder and to hold it straight and aligned.

Since the volume between the upper ring and the back surface of the diaphragm 1154 varies as the piston 1150 moves back and forth, there would be a compression effect in this variable volume which could damage the diaphragm 1154. To prevent this from happening, holes 1164 are drilled through the piston skirt 1166, which allow the excess pressure to bleed off harmlessly into the hollow center 1168 of the piston 1150.

Since the piston is held straight and aligned by the two rings, a conventional wrist pin 1170 and connecting rod 1172 can be used as shown in FIG. 20. Since this allows an up and down motion, as well as back and forth, then there is no need for the slider assembly of FIG. 7.

Figure 22:
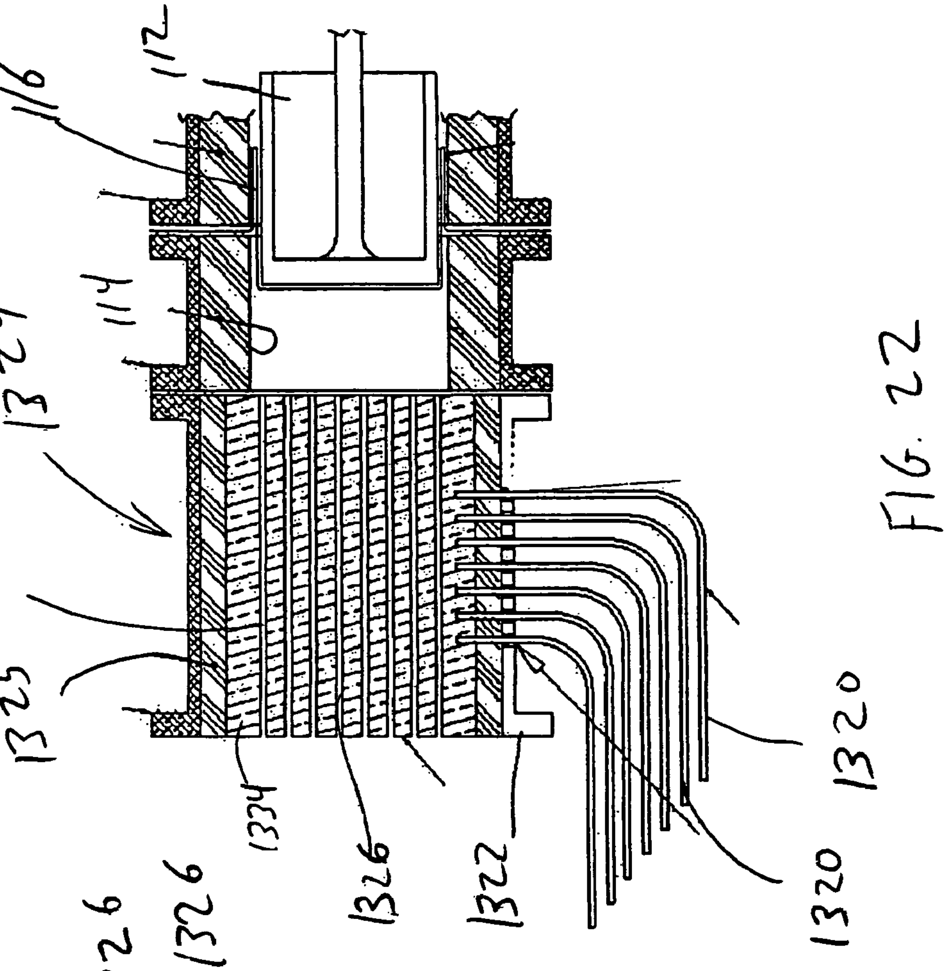
FIG. 22 is a cross-sectional view of the alternative heat injector of FIG. 21.
Figure 21:
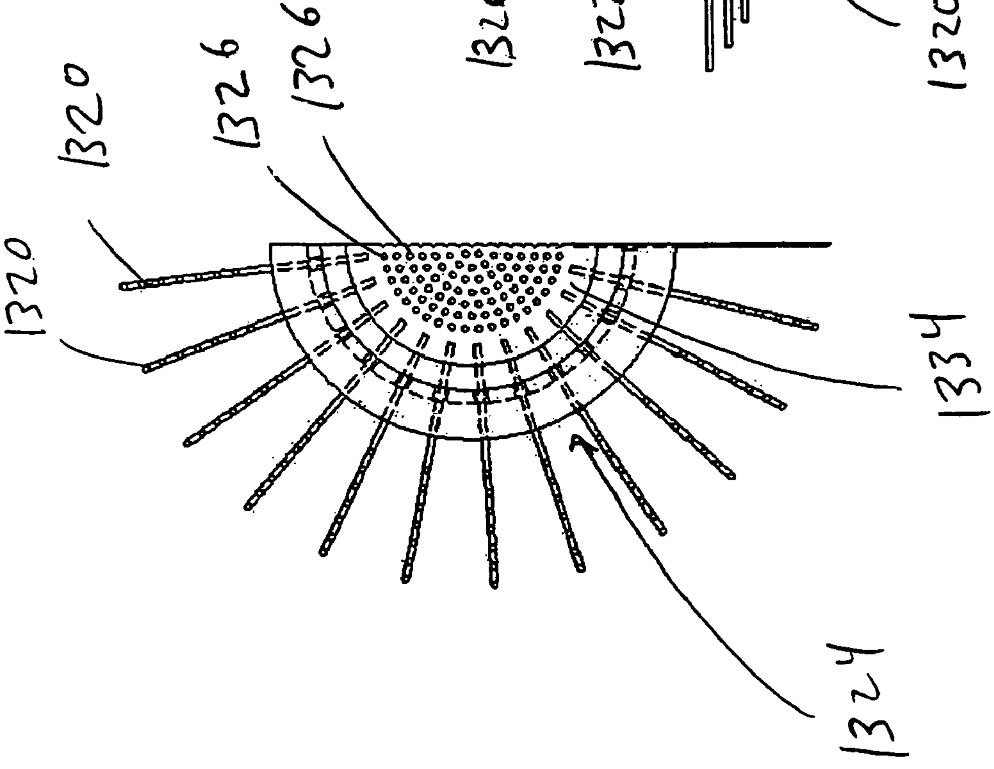
FIG. 21 is a partial end view of an alternative heat injector of the present invention.

FIGS. 21-24, show alternate heat injection systems. The piston 112, cylinder 114 and diaphragm 116 have been previously described in connection with FIG. 5. In FIGS. 21 and 22, heat pipes 1320 are shown passing through the wall 1322 of the heat injector 1324 and insulating material 1325. The heat pipes 1320 contain a fluid which transfers heat through a phase change of the fluid. The heat is transferred to thermally conductive material 1334. Passages 1326 carry the working fluid through the thermally conductive material 1334 and pick up the heat injected by the heat pipes 1320.

Figure 24:
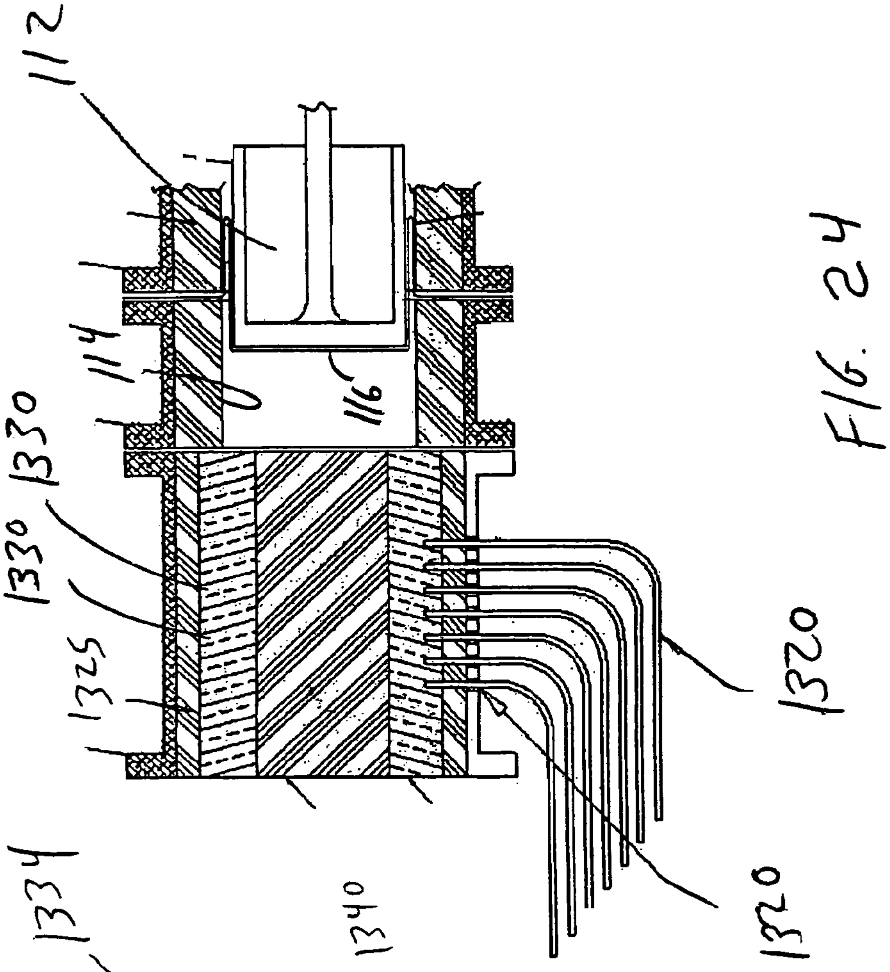
FIG. 24 is a partial cross-sectional view of the alternative heat injector of FIG. 23.
Figure 23:
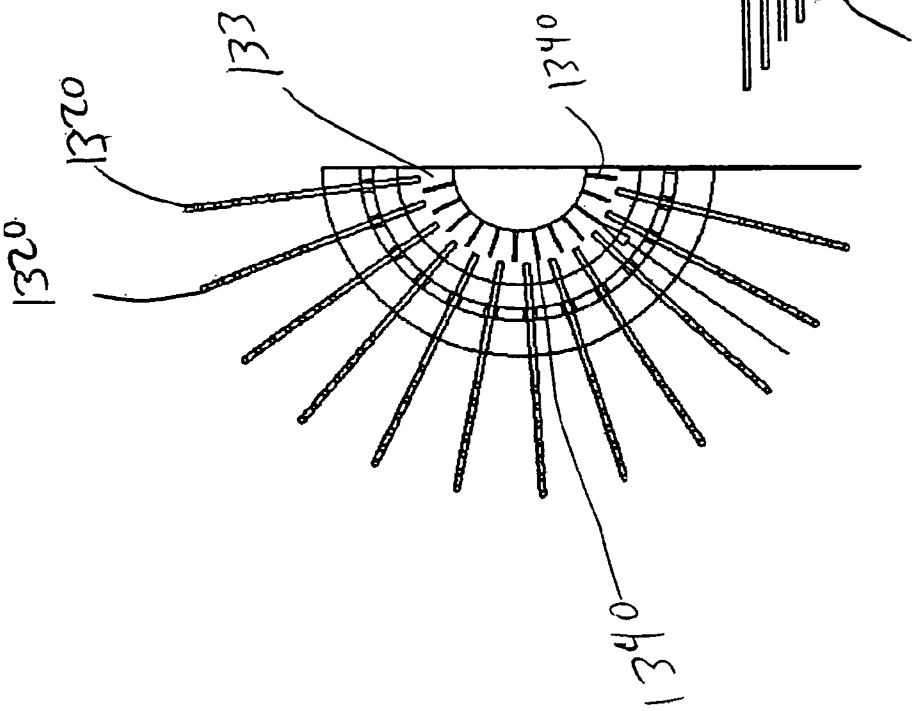
FIG. 23 is a partial end view of another alternative heat injector of the present invention.
Figure 25:
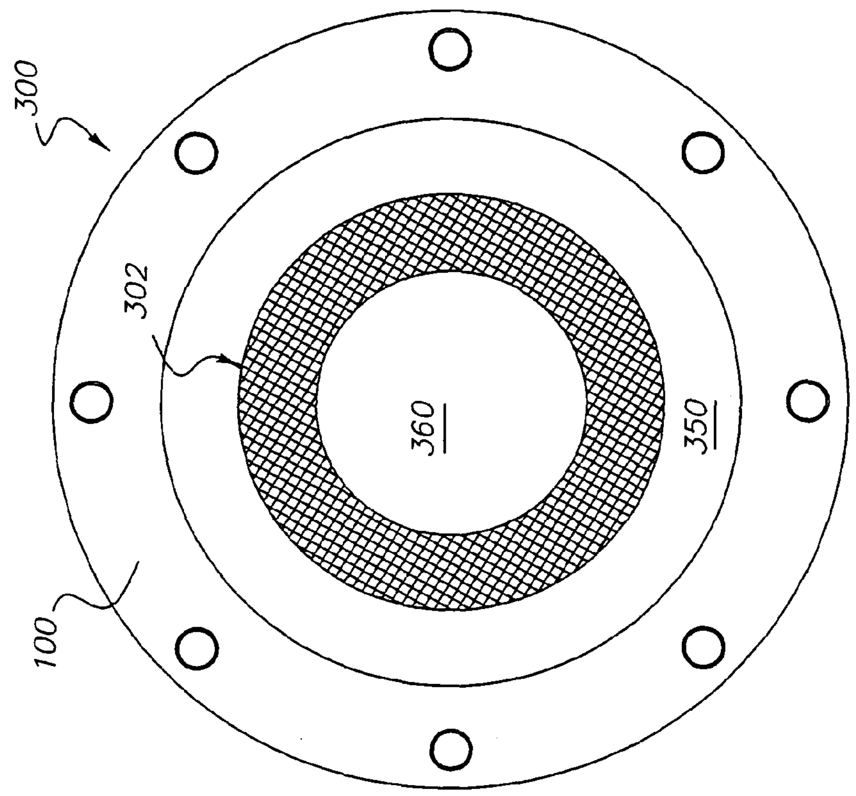
FIG. 25 is an end view of the regenerator of the present invention.
Figure 26:
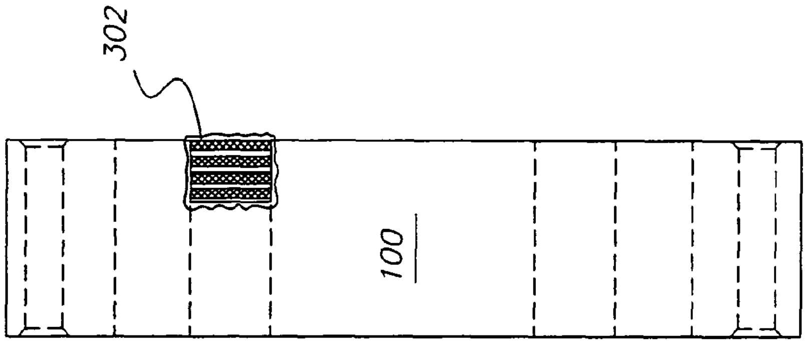
FIG. 26 is a front elevation view of the regenerator of FIG. 25 with a portion of the housing cut away.
Figure 27:
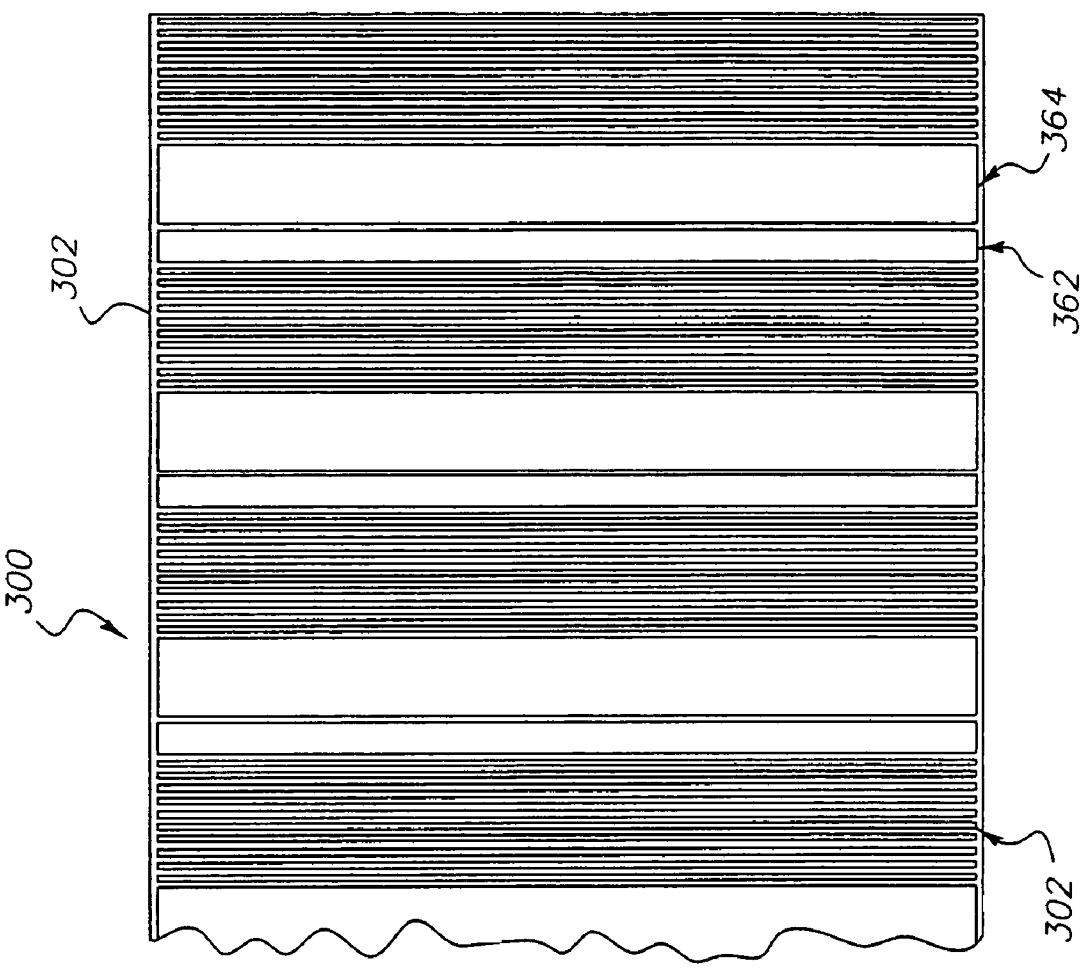
FIG. 27 is a detailed view of a portion of the regenerator of FIG. 26.
Figure 28:
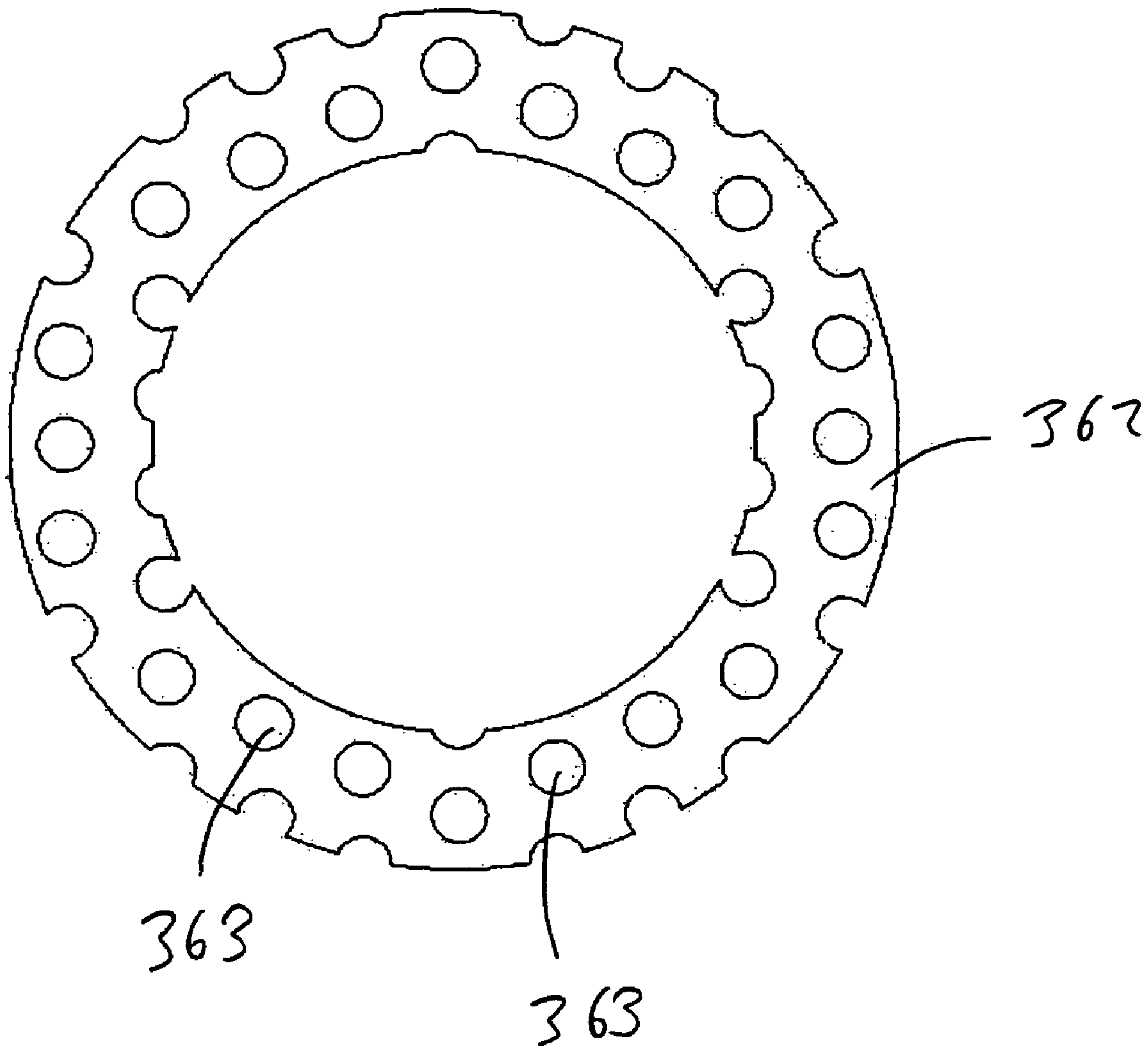
FIG. 28 is a front elevation view of the copper disk portion of the regenerator.

In FIGS. 23 and 24, the longitudinal passages 1326 have been replaced with alternative longitudinal passages 1340 through thermally conductive material 1334, similar to those shown in FIGS. 6A. Also in FIG. 24, the passages of FIG. 22 for the working fluid have been replaced by saw cuts 1340.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

We claim:

1. An externally heated engine comprising:

a) a first piston adapted for movement within a first cylinder said first piston having a first side and a second side opposite the first side, the first side of the first piston and the first cylinder defining a first working chamber and the second side of the first piston and the first cylinder defining a first opposite chamber containing an opposing fluid;

b) a second piston adapted for movement within a second cylinder, said second piston having a first side and a second side opposite the first side, the first side of the second piston and the second cylinder defining a second working chamber and the second side of the second piston and the second cylinder defining a second opposite chamber the second opposite chamber containing an opposing fluid;

c) a closed fluid path between the first and second cylinders, the closed fluid path including a working fluid, the working fluid capable of moving between the first working chamber and the second working chamber, with pressure differential between the working fluid and the opposing fluid in the first opposite chamber;

d) a regenerator within the closed fluid path;

e) a heater for heating the working fluid in the first cylinder;

f) a heat extractor for cooling the working fluid in the second cylinder to a temperature of below 40° Fahrenheit; and g) the first piston and the second piston arranged to reciprocate such that the volume of the working fluid is compressed and expanded alternately such that the ratio of the expanded volume to the compressed volume is greater than 2 to 1.

2. The externally heated engine of claim 1 further including a flexible rolling diaphragm attached to the first piston to create a seal between the first piston and the first cylinder.

3. The externally heated engine of claim 1 in which the heat extractor includes heat pipes which pass through a cylinder wall of the second cylinder.

4. The external combustion engine of claim 3 in which the heat pipes are cooled with thermoelectric coolers.

5. The externally heated engine of claim 3 in which the heat pipes are surrounded by a heat exchanger medium which has a freezing temperature of below 32° Fahrenheit.

6. The externally heated engine of claim 5 in which the heat exchanger medium includes brine.

7. The externally heated engine of claim 5 in which the heat exchanger medium includes methanol.

8. The externally heated engine of claim 5 in which the heat exchanger medium includes ethylene glycol.

9. The externally heated engine of claim 1 in which the heat extractor further includes an insulating core, a heat transfer material surrounding the insulating core, passages through the heat transfer material for carrying the working fluid, passages through the heat transfer material for carrying cold fluid to extract heat from the heat transfer material and thermally insulating material surrounding the heat transfer material.

10. The externally heated engine of claim 1 further including cooling fluid for cooling the working fluid in the heat extractor and wherein the temperature difference between the cooling fluid and the working fluid entering the second cylinder after it has been cooled by the cooling fluid is less than 10 degrees Fahrenheit.

11. The externally heated engine of claim 1 wherein at least one of the first and second pistons has a stroke length and a diameter and wherein the stroke length is greater than the diameter.

12. An externally heated engine comprising:

a) a first piston adapted for movement within a first cylinder, said first piston having a first side and a second side opposite the first side, the first side of the second piston and the second cylinder defining a first working chamber and the second side of the first piston and the second cylinder defining a first opposite chamber the second opposite chamber containing an opposing fluid;

b) a second piston adapted for movement within a second cylinder, said second piston having a first side and a second side opposite the first side, the first side of the second piston and the second cylinder defining a second working chamber and the second side of the second piston and the second cylinder defining a second opposite chamber the second opposite chamber containing an opposing fluid;

c) a closed fluid path between the first and second cylinders, the closed fluid path including a working fluid;

d) a regenerator within the closed fluid path;

e) heat transfer fluid for heating the working fluid in the first cylinder to a temperature of between 250 and 550 degrees Fahrenheit; and f) the first piston and the second piston arranged to reciprocate such that the volume of the working fluid is compressed and expanded alternately such that the ratio of the expanded volume to the compressed volume is greater than 2 to 1.

13. An externally heated engine comprising:

a) a first piston adapted for movement within a first cylinder, said first piston having a first side and a second side opposite the first side, the first side of the first piston and the first cylinder defining a first working chamber and the second side of the first piston and the first cylinder defining a first opposite chamber the first opposite chamber containing an opposing fluid;

b) a second piston adapted for movement within a second cylinder, said second piston having a first side and a second side opposite the first side, the first side of the second piston and the second cylinder defining a second working chamber and the second side of the second piston and the second cylinder defining a second opposite chamber the second opposite chamber containing an opposing fluid;

c) a closed fluid path between the first and second cylinders, the closed fluid path including a working fluid;

d) a regenerator within the fluid path;

e) a heat source for heating the working fluid in the first cylinder to a temperature of less than 500° Fahrenheit; and f.) the first piston and the second piston arranged to reciprocate such that the volume of the working fluid is compressed and expanded alternately.

14. The externally heated engine of claim 12 including a flexible rolling diaphragm attached to the first piston to create a fluid seal between the first piston and the first cylinder.

15. The externally heated engine of claim 13 including a flexible rolling diaphragm attached to the first piston to create a fluid seal between the first piston and the first cylinder.

16. The externally heated engine of claim 12 in which the regenerator includes copper mesh layers.

17. The externally heated engine of claim 13 in which the regenerator includes copper mesh layers.

18. The externally heated engine of claim 16 in which the copper mesh layers are coated with diamond.

19. The externally heated engine of claim 17 in which the copper mesh layers are coated with diamond.

20. The externally heated engine of claim 16 in which the regenerator includes a high melting point thermal insulating polymer surrounding the copper mesh layers.

21. The externally heated engine of claim 12 in which the regenerator includes a high melting point thermal insulating polymer core.

22. The externally heated engine of claim 21 in which the polymer core is polytetrafluoroethylene.

23. The externally heated engine of claim 20 in which the polymer is polytetrafluoroethylene surrounding the copper mesh layers.

24. The externally heated engine of claim 12 in which the regenerator includes a perforated disc constructed from a diamond copper composite.

25. The externally heated engine of claim 16 in which the regenerator includes fiberglass mesh layers between the copper mesh layers.

26. The externally heated engine of claim 17 in which the regenerator included fiberglass mesh layer between the copper mesh layers.

27. The externally heated engine of claim 16 in which the regenerator includes copper disk layers between the copper mesh layers.

28. The externally heated engine of claim 17 in which the regenerator includes copper disk layers between the copper mesh layers.

29. The externally heated engine of claim 16 including a flexible rolling diaphragm attached to the first piston to create a fluid seal between the first piston and the first cylinder.

30. The externally heated engine of claim 17 including a flexible rolling diaphragm attached to the first piston to create a fluid seal between the first piston and the first cylinder.

31. The externally heated engine of claim 1 in which the working fluid is at a pressure of below 10 atmospheres.

32. The externally heated engine of claim 12 further including heat pipes which pass through a wall of the first cylinder.

33. The externally heated engine of claim 13 further including heat pipes which pass through a wall of the first cylinder.

34. The externally heated engine of claim 12 in which the working fluid is at a pressure of below 10 atmospheres.

35. The externally heated engine of claim 13 in which the working fluid is at a pressure of below 10 atmospheres.

36. The externally heated engine of claim 32 in which a heating medium surrounds the heat pipes and the heating medium is heated with thermoelectric generators.

37. The externally heated engine of claim 33 in which a heating medium surrounds the heat pipes and the heating medium is heated with thermoelectric generators.

38. The externally heated engine of claim 1 in which the working fluid is heated with solar energy.

39. The externally heated engine of claim 12 in which the working fluid is heated with solar energy.

40. The externally heated engine of claim 13 in which the working fluid is heated with solar energy.

41. The externally heated engine of claim 1 in which the working fluid is at a pressure of greater than 60 PSI.

42. The externally heated engine of claim 12 in which the working fluid is at a pressure of greater than 60 PSI.

43. The externally heated engine of claim 13 in which the working fluid is at a pressure of greater than 60 PSI.

44. The externally heated engine of claim 12 further including a heat extractor in the fluid path, the heat extractor including a thermally insulating layer surrounding working fluid passages and cooling fluid passages.

45. The externally heated engine of claim 12 further including a heat injector in the fluid path, the heat injector including a thermally insulating layer surrounding working fluid passages and heating fluid passages.

46. The externally heated engine of claim 13 further including a heat injector in the fluid path, the heat injector including a thermally insulating layer surrounding working fluid passages and heating fluid passages.

47. The externally heated engine of claim 46 in which the heat injector further includes an insulating core, a heat transfer material surrounding the insulating core, passages through the heat transfer material for carrying the working fluid, passages through the heat transfer material for carrying hot fluid to inject heat into the heat transfer material and thermally insulating material surrounding the heat transfer material.

48. The externally heated engine of claim 12 wherein at least one of the first and second pistons has a stroke length and a diameter and wherein the stroke length is greater than the diameter.

49. The externally heated engine of claim 13 wherein at least one of the first and second pistons has a stroke length and a diameter and wherein the stroke length is greater than the diameter.

50. An externally heated engine comprising:

a) a piston adapted for movement within a first cylinder said piston having a first side and a second side opposite the first side, the first side and the first cylinder defining a working chamber and the second side and the first cylinder defining a first opposite chamber containing an opposing fluid;

b) a displacer adapted for movement within a second cylinder, said displacer having a first side and a second side opposite the first side, the first side of the displacer and the second cylinder defining a cold chamber and the second side of the displacer and the second cylinder defining hot chamber;

c) a closed fluid path between the first and second cylinders, the closed fluid path including a working fluid, the working fluid capable of moving between the working chamber, the cold chamber and the hot chamber, with a pressure differential between the working fluid and the opposing fluid in the first opposite chamber;

d) a regenerator within the closed fluid path;

e) a heat injector for heating the working fluid;

f) a heat extractor for cooling the working fluid to a temperature of below 40° Fahrenheit; and g) the piston and the displacer arranged to reciprocate to alternately force the working fluid through the heat injector and heat extractor such that the working fluid is compressed and expanded alternately such that the ratio of the expanded volume to the compressed volume is greater than 2 to 1.

51. The externally heated engine of claim 50 further including a flexible rolling diaphragm attached to the piston to create a seal between the piston and the first cylinder.

52. An externally heated engine comprising:

a) a piston adapted for movement within a first cylinder said piston having a first side and a second side opposite the first side, the first side and the first cylinder defining a working chamber and the second side and the first cylinder defining an opposite chamber containing an opposing fluid;

b) a displacer adapted for movement within a second cylinder, said displacer having a first side and a second side opposite the first side, the first side of the displacer and the second cylinder defining a cold chamber and the second side of the displacer and the second cylinder defining a hot chamber;

c) a closed fluid path between the first and second cylinders, the closed fluid path including a working fluid, the working fluid capable of moving between the first working chamber, the cold chamber and the hot chamber, with a pressure differential between the first working fluid and the opposing fluid in the first opposite chamber;

d) a regenerator within the closed fluid path;

e) heat transfer fluid for heating the working fluid to a temperature of between 250 and 550 degrees Fahrenheit; and f) the piston and the displacer arranged to reciprocate such that the volume of the working fluid is compressed and expanded alternately such that the ratio of the expanded volume to the compressed volume is greater than 2 to 1.

53. An externally heated engine comprising:

a) a piston adapted for movement within a first cylinder said piston having a first side and a second side opposite the first side, the first side and the first cylinder defining a working chamber and the second side and the first cylinder defining an opposite chamber containing an opposing fluid;

b) a displacer adapted for movement within a second cylinder, said displacer having a first side and a second side opposite the first side, the first side of the displacer and the second cylinder defining a cold chamber and the second side of the displacer and the second cylinder defining a hot chamber;

c) a closed fluid path between the first and second cylinders, the closed fluid path including a working fluid, the working fluid capable of moving between the working chamber, the cold chamber and the hot chamber;

d) a regenerator within the closed fluid path;

e) a heat source for heating the working fluid to a temperature of less than 500° Fahrenheit; and f) the piston and the displacer arranged to reciprocate such that the volume of the working fluid is compressed and expanded alternately such that the ratio of the compressed volume to the expanded volume is greater than 2 to 1.

54. The externally heated engine of claim 52 further including a flexible rolling diaphragm attached to the piston to create a seal between the piston and the first cylinder.

55. The externally heated engine of claim 53 further including a flexible rolling diaphragm attached to the piston to create a seal between the piston and the first cylinder.

56. The externally heated engine of claim 52 in which the regenerator includes copper mesh layers.

57. The externally heated engine of claim 53 in which the regenerator includes copper mesh layers.

58. The externally heated engine of claim 56 in which the copper mesh layers are coated with diamond.

59. The externally heated engine of claim 57 in which the copper mesh layers are coated with diamond.

60. The externally heated engine of claim 52 in which the regenerator includes a high melting point thermal insulating polymer.

61. The externally heated engine of claim 53 in which the regenerator includes a high melting point thermal insulating polymer.

62. The externally heated engine of claim 60 in which the polymer is polytetrafluoroethylene.

63. The externally heated engine of claim 61 in which the polymer is polytetrafluoroethylene.

64. The externally heated engine of claim 52 in which the regenerator includes a perforated disc constructed from a diamond copper composite.

65. The externally heated engine of claim 56 in which the regenerator includes fiberglass mesh layers between the copper mesh layers.

66. The externally heated engine of claim 57 in which the regenerator includes fiberglass mesh layers between the copper mesh layers.

67. The externally heated engine of claim 56 in which the regenerator includes copper disk layers between the copper mesh layers.

68. The externally heated engine of claim 57 in which the regenerator includes copper disk layers between the copper mesh layers.

69. The externally heated engine of claim 1 further including a bonnet connected to a first end of the first cylinder, the bonnet and the first end of the first cylinder creating a seal to contain the opposing fluid.

70. The externally heated engine of claim 12 further including a bonnet connected to a first end of the first cylinder, the bonnet and the first end of the first cylinder creating a seal to contain the opposing fluid.

71. The externally heated engine of claim 13 further including a bonnet connected to a first end of the first cylinder, the bonnet and the first end of the first cylinder creating a seal to contain the opposing fluid.

72. An externally heated engine comprising:

a) a piston adapted for movement within a first cylinder, said piston having a first side and a second side opposite the first side, the first side and the first cylinder defining a working chamber and the second side and the first cylinder defining an opposite chamber containing an opposing fluid;

b) a displacer adapted for movement within a second cylinder, said displacer having a first side and a second side opposite the first side, the first side of the displacer and the second cylinder defining a cold chamber and the second side of the displacer and the second cylinder defining a hot chamber;

c) a closed fluid path between the first and second cylinders, the closed fluid path including a working fluid, the working fluid capable of moving between the working chamber, the cold chamber and the hot chamber;

d) a regenerator within the closed fluid path; and e) a heat source for heating the working fluid to a temperature of less than 500° Fahrenheit.

73. The externally heated engine of claim 72 wherein the heat source includes a heat injector including a heated fluid for heating the working fluid in the hot chamber, wherein the heated fluid does not come into direct contact with the working fluid.

74. The externally heated engine of claim 73 wherein the temperature differential between the heated fluid in the heat injector and the working fluid in the hot chamber is less than 5 degrees Fahrenheit.

75. The externally heated engine of claim 72 further including a heat extractor including a cold fluid for cooling the working fluid in the cold chamber, wherein the cold fluid does not come into direct contact with the working fluid.

76. The externally heated engine of claim 75 wherein the temperature differential between the cold fluid in the heat extractor and the working fluid in the cold chamber is less than 5 degrees Fahrenheit.

77. The externally heated engine of claim 72 wherein the working fluid pressure is controlled to throttle the engine.

78. The externally heated engine of claim 72 wherein the opposing fluid pressure is maintained above atmospheric pressure.

79. The externally heated engine of claim 72 further including a bonnet creating a seal to contain the opposing fluid.

80. The externally heated engine of claim 72 further including a diaphragm attached to the piston to create a seal between the piston and the first cylinder.

81. The externally heated engine of claim 72 wherein the working fluid in the cold chamber is above atmospheric pressure.

* * * * *